United States Patent
Kim et al.

(10) Patent No.: US 9,853,546 B2
(45) Date of Patent: Dec. 26, 2017

(54) METHOD AND APPARATUS FOR REDUCING OVERSHOOT AND UNDERSHOOT USING A RECONFIGURABLE INDUCTOR FOR SWITCHING MODE VOLTAGE

(71) Applicant: Intel Corporation, Santa Clara, CA (US)

(72) Inventors: Donghwi Kim, Chandler, AZ (US); Sergio Augusto Clavijo, Phoenix, AZ (US); Tae H. Kim, Chandler, AZ (US); James S. Dinh, Federal Way, WA (US)

(73) Assignee: INTEL CORPORATION, Santa Clara, CA (US)

( * ) Notice: Subject to any disclaimer, the term of this patent is extended or adjusted under 35 U.S.C. 154(b) by 28 days.

(21) Appl. No.: 14/757,874

(22) Filed: Dec. 23, 2015

(65) Prior Publication Data
US 2017/0187285 A1    Jun. 29, 2017

(51) Int. Cl.
*G05F 1/12* (2006.01)
*H02M 3/158* (2006.01)
*H02M 1/32* (2007.01)
*H02M 1/08* (2006.01)
*H02M 1/00* (2006.01)

(52) U.S. Cl.
CPC ............ *H02M 3/158* (2013.01); *H02M 1/08* (2013.01); *H02M 1/32* (2013.01); *H02M 2001/0009* (2013.01)

(58) Field of Classification Search
CPC . H02M 2003/1566; H02M 2001/0009; H02M 1/08; H02M 1/32

USPC ....... 323/206, 214, 232, 240, 247, 290, 301, 323/328
See application file for complete search history.

(56) References Cited

U.S. PATENT DOCUMENTS

| 5,754,034 A | 5/1998 | Ratliff et al. |
| 6,674,320 B2 | 1/2004 | Duffy et al. |
| 2004/0135661 A1* | 7/2004 | Haugs .................. G05F 1/32 336/212 |
| 2007/0007935 A1* | 1/2007 | Johnson .................. H02M 1/15 323/282 |

(Continued)

FOREIGN PATENT DOCUMENTS

| JP | 09-035942 A | 2/1997 |
| KR | 10-2006-0091507 A | 8/2006 |

OTHER PUBLICATIONS

PCT Notification of Transmittal of the International Search Report and the Written Opinion of the International Searching Authority, or the Declaration for PCT6 Counterpart Application No. PCT/US2016/057544, 13 pgs., (dated Jan. 26, 2017).

*Primary Examiner* — Alex Torres-Rivera
(74) *Attorney, Agent, or Firm* — Blakely, Sokoloff, Taylor & Zafman LLP

(57) ABSTRACT

An apparatus and methods for reducing overshoot and undershoot using a reconfigurable inductor in a switching voltage regulator. Specifically, the switching voltage regulator includes a reconfigurable inductor, the reconfigurable inductor has a conductive control ring, and the conductive control ring has an adjustable enclosed area controlled by at least a first switch, wherein the reconfigurable inductor has a varying inductance based on a state of at least the first switch and the adjustable enclosed area of the conductive control ring is shown.

25 Claims, 15 Drawing Sheets

(56) References Cited

U.S. PATENT DOCUMENTS

| | | | |
|---|---|---|---|
| 2008/0284550 A1 | 11/2008 | Shinmen et al. | |
| 2010/0320994 A1* | 12/2010 | Hashino | H01F 27/385 323/312 |
| 2016/0294284 A1* | 10/2016 | Lerdworatawee | H03F 3/2173 |
| 2017/0005532 A1* | 1/2017 | Akuzawa | H02J 17/00 |

* cited by examiner

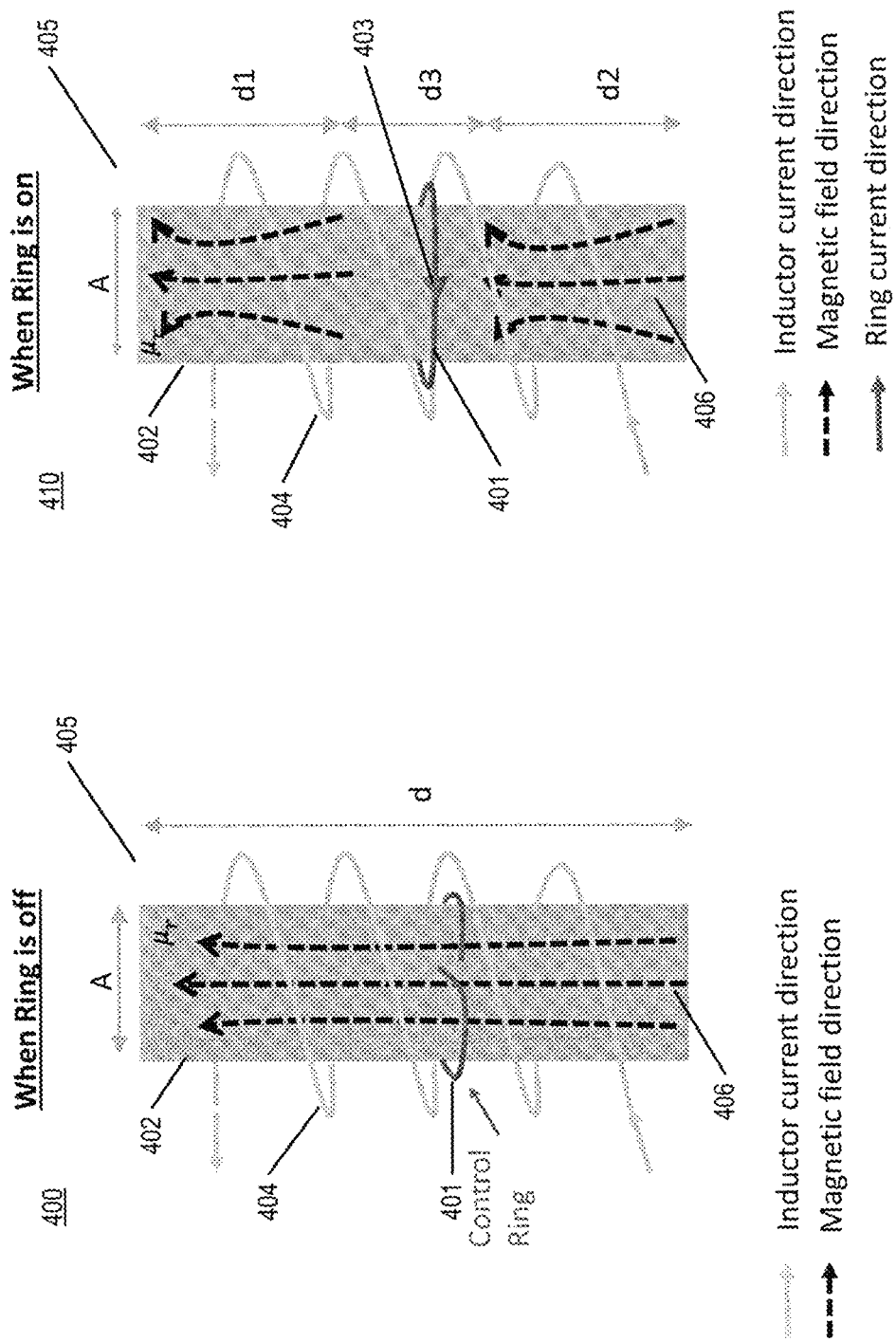

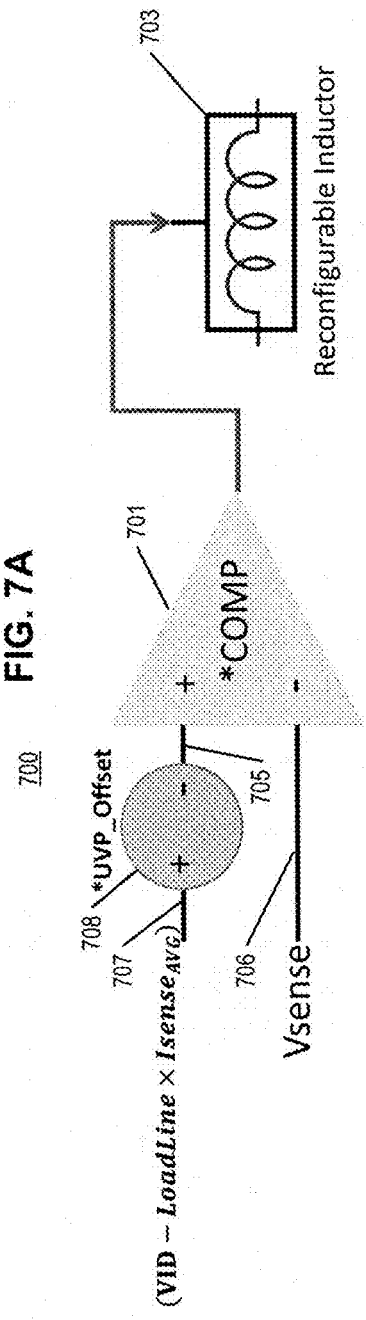

FIG. 7A

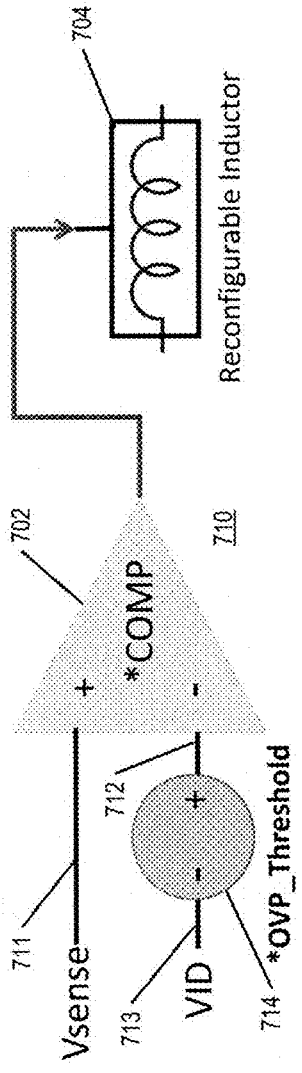

FIG. 7B

1. Vsense: VR output voltage at package sense point.
2. Isense_AVG: sensed average inductor current from power stage.
3. LoadLine: abs ($\Delta V_{SENSE}/\Delta I_{LOAD}$)
3. UVP_Offset is programmable and used for preventing faulty triggering.
4. *In addition to OVP_Threshold and UVP_Offset, COMP (a comparator) can be designed to have a hysteresis featuring a hysteretic rise/fall triggering threshold.
5. All implementation in this illustration can be in digital domain.
6. VID: Voltage Identification (ID)

1. Vout: VR output voltage.
2. Vref: Reference voltage (ex. Target Vout).
3. *In addition to OVP_Threshold and UVP_Threshold, COMP (a comparator) can be designed to have a hysteresis featuring a hysteretic rise/fall triggering threshold.
4. All implementation in this illustration can be in digital domain.

|  | 1.1uH (No reconfiguration) | 1.1uH to 0.7uH | 1.1uH to 0.5uH | 1.1uH to 0.3uH |
|---|---|---|---|---|
| Overshoot Voltage (V) | 1.2718 | 1.2609 | 1.254 | 1.25 |
| Overshoot Duration (uSec) | 14 | 10 | 8 | 6 |

METHOD AND APPARATUS FOR REDUCING OVERSHOOT AND UNDERSHOOT USING A RECONFIGURABLE INDUCTOR FOR SWITCHING MODE VOLTAGE

FIELD OF THE INVENTION

Embodiments of the present invention relate to the field of computer systems, and more particularly to a reconfigurable inductor in a switching mode voltage regulator that provides varying inductance and reduces overshoot and undershoot.

BACKGROUND OF THE INVENTION

Inductors are used in many integrated circuit applications, such as for power regulation, filtering, and low ripple or fast transient responses during a load transient. For example, inductors are required in miniaturized devices that may include a voltage regulator (VR) in an integrated circuit, or a component in a low power application.

Unfortunately, an inductor in a voltage regulator power stage has two conflicting requirements: a lower ripple voltage with a slower transient response, or a higher ripple voltage with a faster transient response. Typically, an inductor with a high inductance value has a lower ripple, as such a lower core loss, but it suffers from a slower transient response. On the other hand, an inductor with a lower inductance value has a higher ripple, but it benefits from a faster transient response. As such, the inductor in the integrated circuit application is selected based on one of these two requirements.

In some applications, an inductor may need to be reconfigurable. To be reconfigurable, the inductance of the inductor should be capable of being selectively modified to more than one inductance value in a real time setting. Therefore, if the inductor can be reconfigured (or reset) in a real time setting, the inductor may satisfy both requirements and provide a low ripple voltage and a fast transient response. In other applications, the inductor may be required to reduce an undesirable voltage deviation (alternatively referred to as an overshoot or undershoot) during a load transient, which would essentially save passive costs in silicon and provide a smaller design platform. However, these requirements for a reconfigurable inductor have not been currently or adequately met.

BRIEF DESCRIPTION OF THE DRAWINGS

The invention may best be understood by referring to the following description and accompanying drawings that are used to illustrate embodiments of the invention. In the drawings:

FIGS. 4A-B are detailed block diagrams illustrating a reconfigurable inductor with a conductive control ring in an off position and an on position, respectively, according to some embodiments.

FIG. 7A is a block diagram of an under voltage protection (UVP) comparator used to reduce undershoot in a current sensing VR according to one embodiment; and FIG. 7B is a block diagram of an over voltage protection (OVP) comparator used to reduce overshoot in a current sensing VR according to one embodiment.

FIG. 14 is a table illustrating an overshoot voltage and an overshoot duration improving with one or more reconfigurable inductor values according to one embodiment.

DETAILED DESCRIPTION OF THE PRESENT INVENTION

Figure 1:
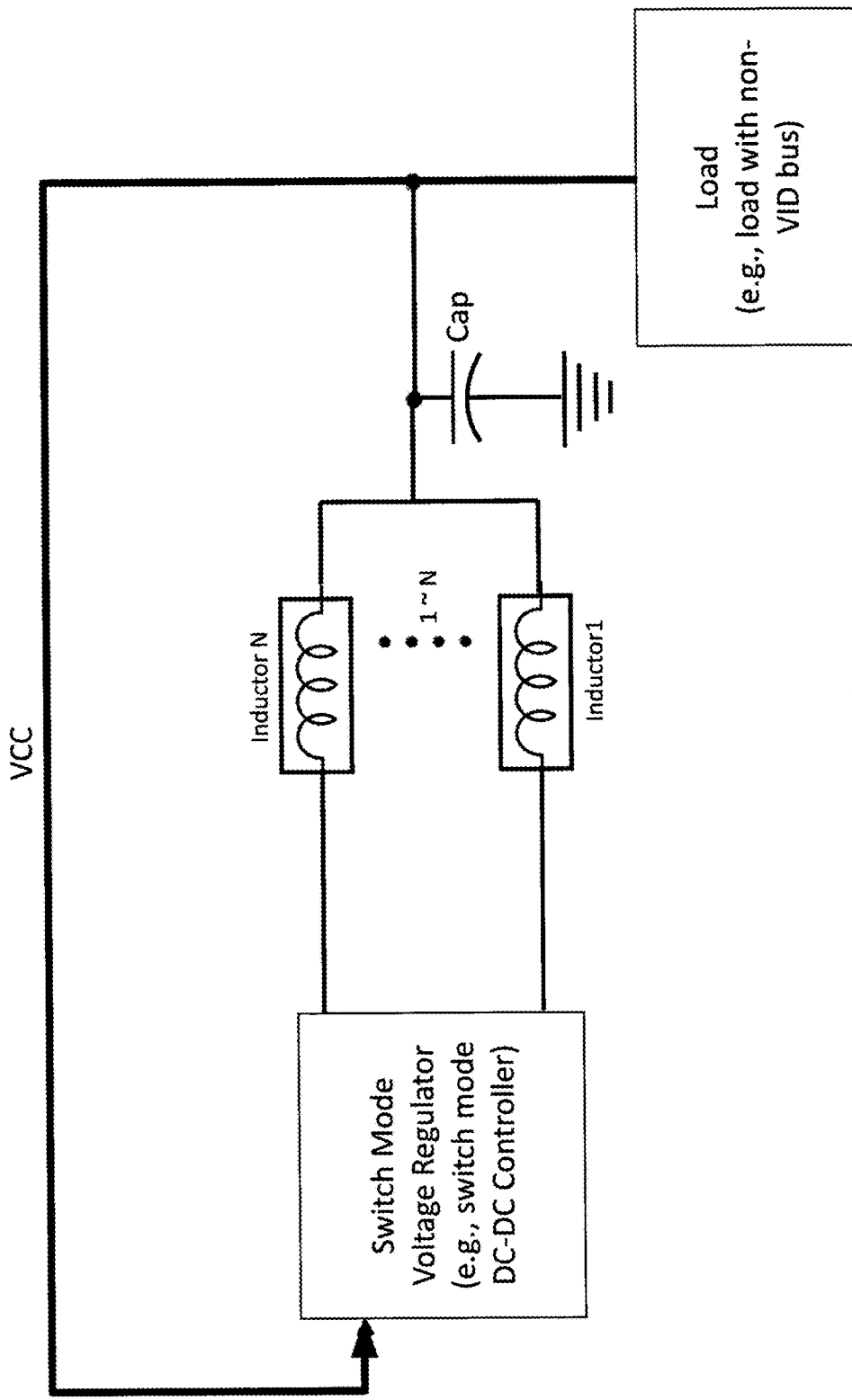
FIG. 1 is a conventional circuit diagram illustrating a switching mode voltage regulator and its equivalent circuit according to the prior art.

The following descriptions describe an apparatus and methods for reducing overshoot and undershoot using a reconfigurable inductor in a switching mode voltage regulator. Specifically, a reconfigurable inductor in a switching mode voltage regulator that provides varying inductance and reduces overshoot and undershoot is described herein. The descriptions described herein improve and advantageously: provide a reconfigurable inductor that can be reset in a real time manner/setting from a low inductance to a high inductance and vice-versa using a switch control circuit; provide both a low ripple voltage and a fast transient response in the switched voltage regulator; and effectively reduce the undesirable voltage deviation (e.g., an overshoot voltage and an undershoot voltage) during a load transient response.

As used herein, a "reconfigurable inductor" refers to a dynamic inductor that can be reconfigured in a real-time setting to provide more than one inductance value, and reset in a real-time setting from a low inductance to a high inductance and vice-versa. In other words, the reconfigurable inductor provides a varying inductance that includes a range of inductance values, and is designed to drop its inductance from a maximum inductance value (L0) to any one or more configured values (and alternatively it can raise its inductance from any of the one or more configured values to the maximum inductance or any inductance value between these two respective values). As used herein, a "varying inductance" refers to the reconfigurable inductor designed to vary its inductance over a range of inductance values.

Ripple is one characteristic for qualifying a voltage regulator. The smaller the ripple the better. In general, to achieve a given ripple constraint, inductors can be used to "smooth" the output signal. Another factor is transient response. Transient response time is essentially the time required for the output voltage (e.g., $V_{out}$) to respond to a change from a controller or to a change in a load current. In sizing the inductors, a trade-off typically exists between ripple and transient response. With larger inductors, ripple reduction improves but transient response time increases (i.e., a slower transient response). Meanwhile, with smaller inductors, ripple reduction decreases but transient response decreases (i.e., a faster transient response). With all of this in mind, the inductor structures disclosed herein and described in the following sections provide a flexible solution for implementing reconfigurable inductors that provide and satisfy both desired inductor characteristics (a low ripple and a faster transient response), and that effectively reduce overshoot and undershoot of a voltage regulator.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. As used herein, unless otherwise specified the use of the ordinal adjectives "first", "second", "third", etc. that are used to describe a common object, merely indicate that different instances of like objects are being referred to, and are not intended to imply that the described objects must be in a given sequence, either temporarily, spatially, in ranking or in any other manner.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. Also, the term "coupled" may be refer to either a direct electrical connection between the things that are connected, or an indirect connection through one or more passive or active intermediary devices. "Connected" is used to indicate the establishment of communication between two or more elements that are coupled with each other. Also, the term "circuit" means one or more passive and/or active components that are arranged to cooperate with one another to provide a desired function. The term "signal" means at least one current signal, voltage signal or data/clock signal. The meaning of "a", "an", and "the" include plural references. The meaning of "in" includes "in" and "on".

The embodiments can be implemented in numerous ways, including as a process, an apparatus, a system, a composition of matter, a computer readable medium such as a computer readable storage medium or a computer network wherein program instructions are sent over optical or communication links. A component such as a processor or a memory described as being configured to perform a task includes a general component that is temporarily configured to perform the task at a given time and/or a specific component that is manufactured to perform the task. In general, the order of the steps of disclosed processes can be altered within the scope of the invention.

FIG. 1 is a conventional circuit diagram illustrating a switching mode voltage regulator and its equivalent circuit according to the prior art. Specifically, FIG. 1 illustrates an exemplary circuit diagram of a voltage regulator using a non-reconfigurable inductor (also referred to as a conventional inductor). The conventional circuit diagram of the conventional voltage regulator generally includes at least a switch mode DC-DC controller, one or more conventional inductors, a capacitor, and a load. The one or more inductors are connected between the switch mode controller and the load. The capacitor is connected between the output terminal of the one or more inductors and the ground. Accordingly, the conventional voltage regulator of FIG. 1 is configured to provide/accommodate the requirements of either a low ripple voltage or a fast transient response by using a high value inductor or a low value inductor, respectively, for the conventional inductor(s).

Figure 2A:
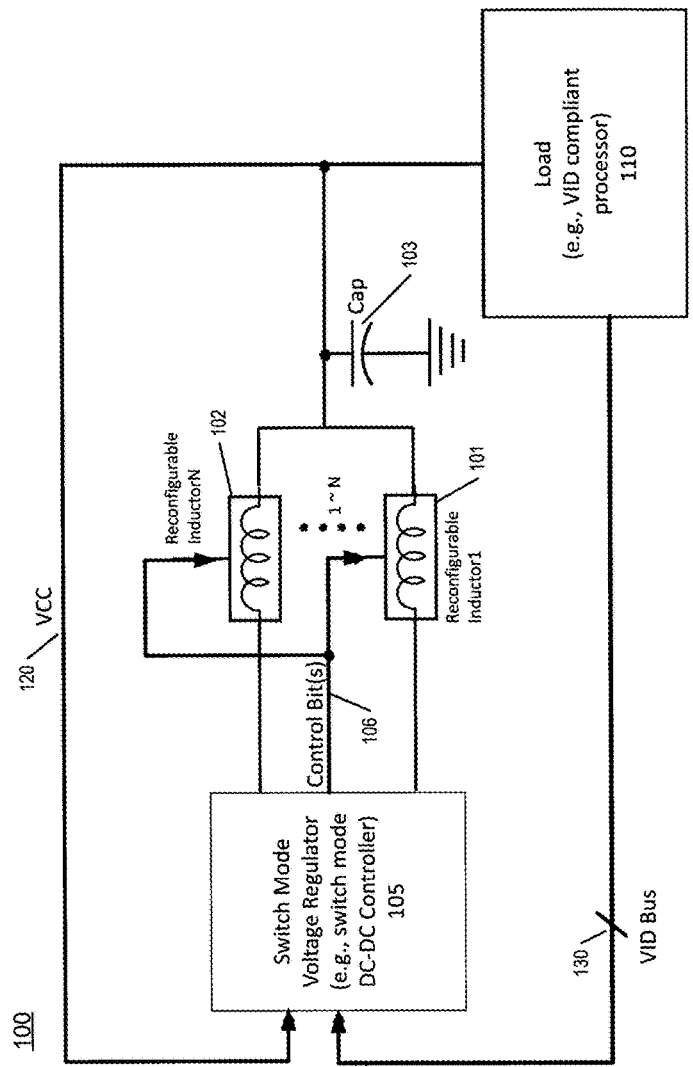
FIG. 2A is a circuit diagram illustrating a voltage identification (VID) bus terminal and a switching mode voltage regulator with one or more reconfigurable inductors according to one embodiment.
Figure 2B:
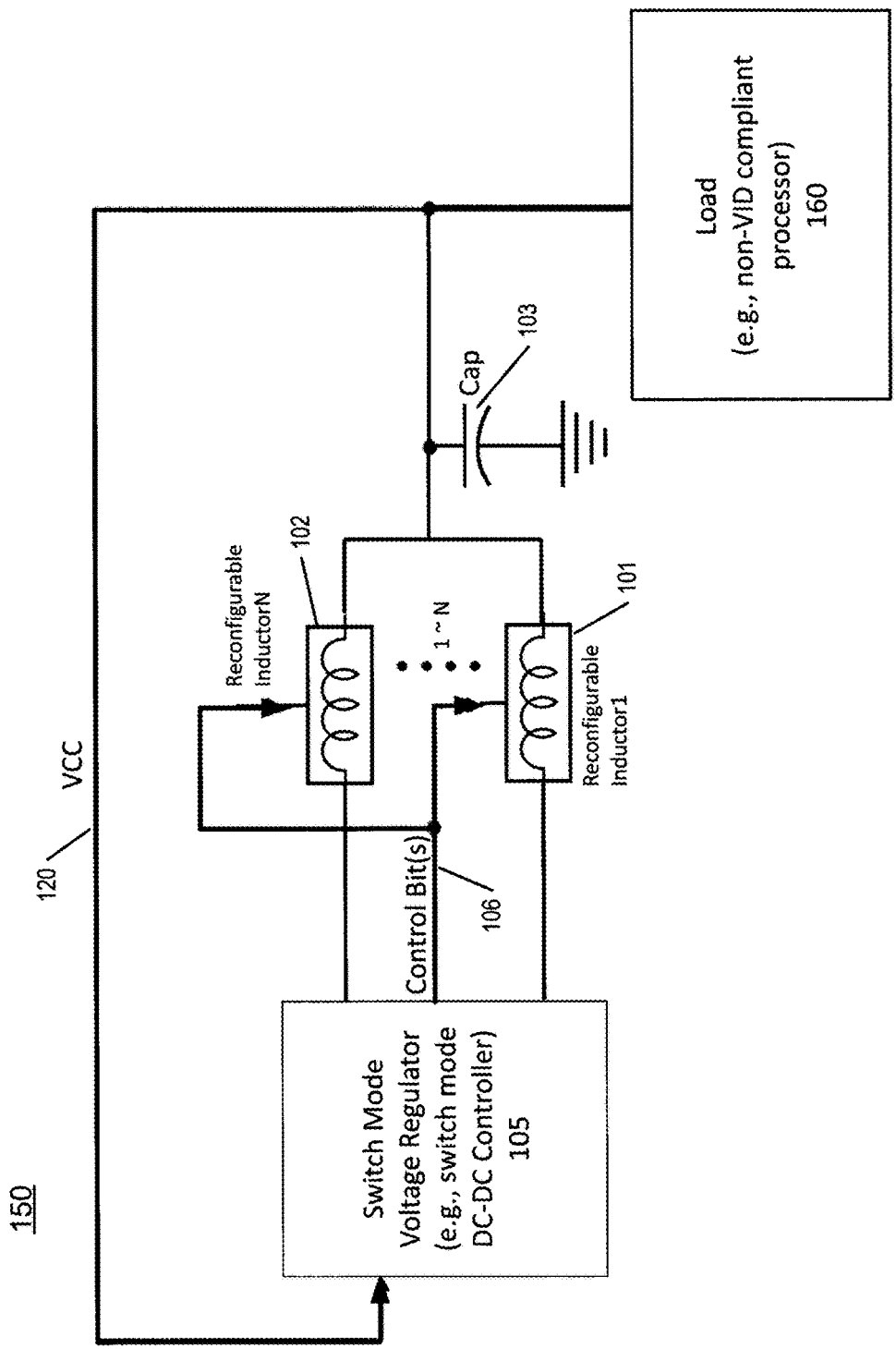
FIG. 2B is a circuit diagram illustrating a switching mode voltage regulator with one or more reconfigurable inductors according to one embodiment.

FIG. 2A is a circuit diagram 100 illustrating a voltage identification (VID) telemetry bus (also referred to as a voltage ID bus) and a switching mode voltage regulator with one or more reconfigurable inductors according to one embodiment; and FIG. 2B is a circuit diagram 150 illustrating a switching mode voltage regulator with one or more reconfigurable inductors according to one embodiment. As used herein, a "VID" refers to a telemetry environment that allows a CPU to dynamically control output voltages, slew rates, and power states, as well as monitor the load device and communicate with a voltage regulator via a VID bus. For example, the CPU uses the VID bus to select/determine a supply voltage (e.g., Vcc). As such, FIGS. 2A-B illustrate an example of interactions between different components of system 100 and system 150, respectively, where system 100 includes a VID bus 130 and system 150 does not include a VID bus. It is pointed out that the components of FIGS. 2A-B that have the same reference numbers (or names) as components of any other figure can operate or function in any manner similar to that described herein, but are not limited to such. Further, the lines connecting the blocks represent communication between different components of the respective circuit diagrams.

Referring now to FIG. 2A, system 100 is an exemplary circuit diagram illustrating a switching voltage regulator and its equivalent circuit using one ore more reconfigurable inductors 101-102. The switching voltage regulator may also be referred to as a switching/switched mode voltage regulator, a voltage regulator, a switching power stage, a switch mode DC-DC controller, etc. As used herein, a "switching voltage regulator" generates a constant DC output voltage (e.g., Vcc) and contains circuits that keep the output voltage on a supplied load (e.g., load 110) at a regulated value. Typically, this task is accomplished using a switching power stage (e.g., controller 105), the switches of which are turned on and off by respective driver circuits.

System 100 includes, but is not limited to, switch mode voltage regulator 105 (hereinafter, "voltage regulator 105"), reconfigurable inductors 101-102, capacitor 103, load 110, one or more control bits 106, VID bus 130, and supply voltage 120 (also referred to as a power supply, a power source, a voltage supply, a voltage source, a Vcc supply, or a Vcc source). In one embodiment, voltage regulator 105 may supply power to one or more components of system 100, and may receive signal indicating one or more power states or operating conditions of the one or more components powered by voltage regulator 105. According to one embodiment, the voltage level of the power supplied by a voltage regulator may be provided at a target voltage level determined by the design characteristics of the voltage regulator. The target voltage level tray additionally be determined by a signal (e.g., VID bus 130) provided to the voltage regulator indicating the target voltage level desired by the one or more components load 110) powered by the voltage regulator. For example, load 110 may be capable of operating at two or more different target voltage levels associated with two or more different performance modes, and load 110 may indicate its desired target voltage level to voltage regulator 105.

According to one embodiment, reconfigurable inductors 101-102 are output inductors and coupled between voltage regulator 105 (or any DC-DC controller) and load 110. In one embodiment, the voltage regulator may include a reconfigurable inductor (e.g., reconfigurable inductor 101) or more than one reconfigurable inductor (e.g., reconfigurable inductor 102 which refers to a total number "N" of reconfigurable inductors). Meanwhile, capacitor 103 is connected between the output terminal of reconfigurable inductors 101-102 and the ground. In one embodiment, reconfigurable inductors 101-102 and capacitor 103 are used to stabilize and smooth supply voltage 120 by effectively reducing ripples created by the switching power stages of voltage regulator 105. Control bits 106 can reconfigure/control reconfigurable inductors 101-102 using software, detecting comparators, or any other logic or combination.

In one embodiment, a reconfigurable inductor includes one or more conductive control rings (discussed in further detail below). Each conductive control ring is loaded with one or more switches that can be controlled by software or logic (e.g., control bits 106). Accordingly, each conductive control ring is placed in an appropriate place within the reconfigurable inductor to create more than on inductance values. In other words, the reconfigurable inductor can output a varying inductance based on a state of at least a first switch (an on/off state) and an adjustable enclosed area created when at least the first switch is closed (i.e., in the on state). For example, if reconfigurable inductor 101 had only one conductive control ring and one switch, reconfigurable inductor 101 can be designed to drop its inductance from a maximum inductance (L0) when the first switch is in the off state to any given value (e.g., 0.8*L0) when the first switch is in the on state. However, note that the reconfigurable inductor can be configured to operate with opposite logic configurations (i.e., a maximum inductance (L0) when the first switch is in the on state, a lowered inductance value when the first switch is in the on state, etc.).

In one embodiment, VID bus 130 delivers an advanced event post to voltage regulator 105, such as in one or two switching clock cycles earlier than a harsh load transient, during both load transient events (i.e., a light to heavy load transient event, and a heavy to light load transient event). For example, load 110 can provide a few cases of load transient events (e.g., a set of threshold messages, load steps, etc.) to voltage regulator 105 by using VID telemetry and internally sensed current information. According to one embodiment, load 110 is configured to support VID telemetry and communicate via VID bus 130. Continuing on with the above example, in response to receiving the advanced transient events, voltage regulator 105 reconfigures the reconfigurable inductors 101-102 to lowered inductance values. Then, voltage regulator 105 maintains the lowered inductance values during the transient event in order to accommodate a faster transient response and accordingly reduce overshoot and undershoot. Alternatively, voltage regulator 105 can reconfigure the reconfigurable inductors 101-102 to higher inductance values, and maintain the larger inductance values during the transient event in order to accommodate a lower ripple voltage and accordingly reduce overshoot and undershoot.

On the other hand, voltage regulator 150 and reconfigurable inductors 101-102 may be coupled with a load as shown in FIG. 2B, where the load does not include a VID bus or a transient self-detection circuit. Referring now to FIG. 2B, system 150 includes, but is not limited to, voltage regulator 105, reconfigurable inductors 101-102, capacitor 103, load 160, one or more control bits 106, and supply voltage 120 (e.g., Vcc). In one embodiment, system 150 is a circuit diagram illustrating a switching voltage regulator, as in system 100, however system 150 includes load 160, which is not coupled to voltage regulator 105 via a VID bus. Instead, in one embodiment, voltage regulator 105 uses one or more transient detection circuits (as shown in FIGS. 7A-B and 8A-B) to detect a load transient, and accordingly reconfigures the reconfigurable inductors 101-102 when the detection circuits detect the load transient.

Furthermore, voltage regulator 105 may be an AVP enabled voltage regulator or a non-AVP mode voltage regulator, according to one embodiment. In accordance with alternate embodiments, a voltage regulator may be defined to include more or fewer circuit components than those shown in FIGS. 2A-B, and the voltage regulator of FIGS. 2A-B may be partitioned differently. For example, multiple elements may be integrated into a single component, and single elements may be divided into multiple components.

An advantage of the embodiments described herein is that the reconfigurable inductors will improve a computer system by decreasing the transient response time and reducing overshoot and undershoot to protect the CPU loads. In addition, another advantage of the embodiments described herein is that the methods and apparatus of the reconfigurable inductor provide both a lower ripple and a faster transient response, which translates to improved performance and can be used as a design know for lower cost. For example, with the reconfigurable inductor, the number of bulk caps (e.g., capacitor 103) at the output of the voltage regulator can be reduced to achieve a given performance.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions. Note that the configuration shown in FIGS. 2A-B shall be referenced throughout the description. Also note that the configuration of the reconfigurable inductors is not limited to a particular configuration, as such reconfigurable inductors 101-102 may be configured to operate as an output inductor, an inductor in an input stage, and/or any inductor configuration.

Figure 3:
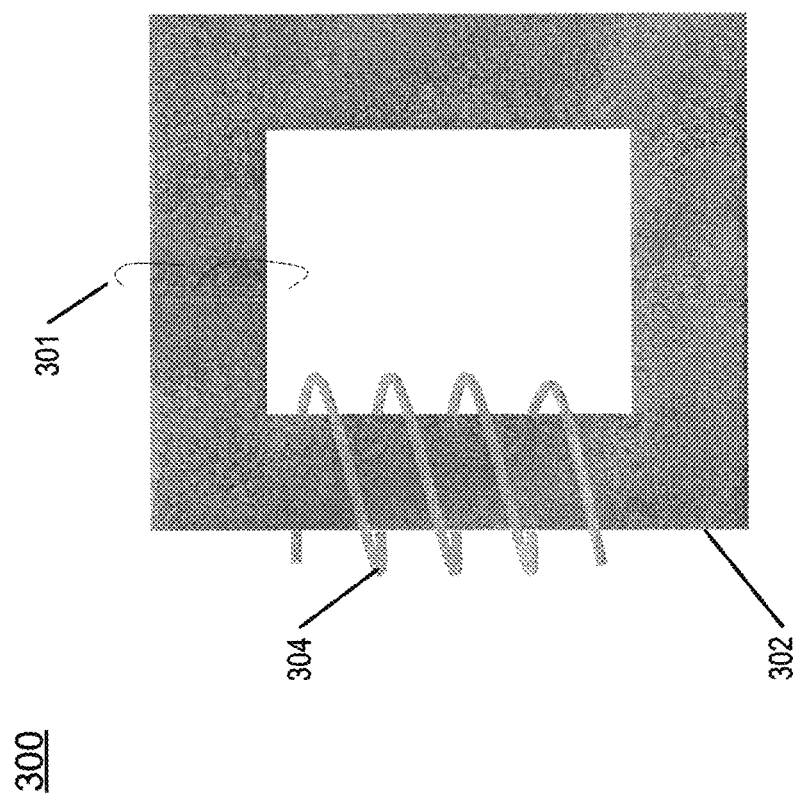
FIG. 3 is a block diagram illustrating a reconfigurable inductor with a conductive control ring according to one embodiment.

FIGS. 3-6 illustrate different embodiments of a reconfigurable inductor. FIG. 3 is a block diagram illustrating a reconfigurable inductor with a conductive control ring according to one embodiment. FIG. 3 illustrates an example of interactions between different components of a reconfigurable inductor. Referring now to FIG. 3, reconfigurable inductor 300 includes, but is not limited to, conductive control ring 310, inductor core 302, and inductor winding 304. According to this exemplary embodiment, the inductance of the output inductor is reconfigured/changed in a real time setting by manipulating the magnetic flux (as shown in FIGS. 4A-B) in the inductor with conductive control ring 301 that is appropriately placed. One or more switches (not shown) load conductive control ring 301 with an electric current when at least one switch is in an on state.

In one embodiment, conductive control ring 301 is an open, electrically conductive ring that includes at least one switch in its off state. According to one embodiment, conductive control ring 301 may be appropriately placed in any configuration that causes the reconfigurable inductor to have a lowered inductance. Conductive control ring 301 is not limited to any particular place/location within the reconfigurable inductor. Note that a conductive control ring may induce the current of the reconfigurable inductor when the conductive control ring is closed, but the conductive control ring is not limited to a particular configuration, such as being coupled, in parallel, or in series with the inductor. Conductive control ring 301 is not limited to a particular type of material. Also, conductive control ring 301 is not limited to a particular size, instead conductive control ring 301 may have an adjustable enclosed area that can increase/decrease based on one or more switches and a desired inductance value or range. The adjustable enclosed area of the conductive control ring and its placement is discussed in further detail in FIG. 6A.

Figure 5B:
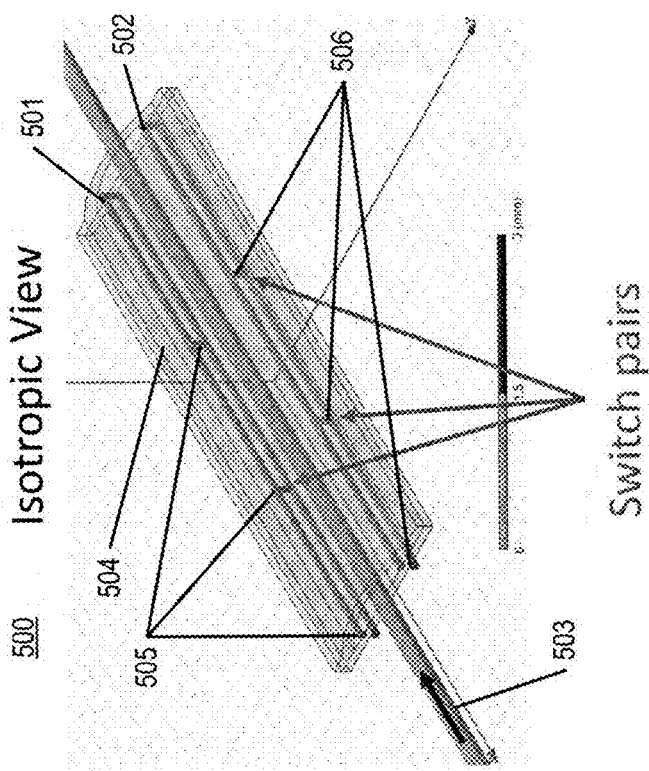
FIG. 5B is an isotropic view of a reconfigurable inductor with one or more conductive control rings and switches according to one embodiment.
Figure 5A:
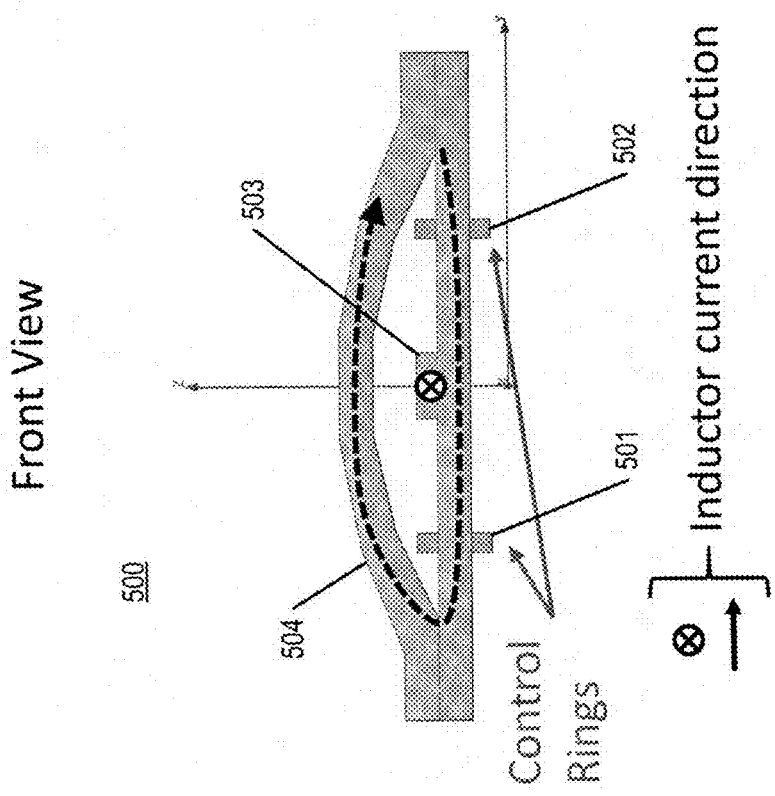
FIG. 5A is a front view of a reconfigurable inductor with one or more conductive control rings and switches according to one embodiment.

Reconfigurable inductor 300 is not limited to a particular type of inductor. Although reconfigurable inductor 300 is shown as a solenoid inductor, other inductors may also be used with similar results (as shown in FIG. 5A-B), such as a variable inductor, air core inductor, ferromagnetic core inductor, or any other type of inductor. Any coiled conductor capable of storing energy is suitable for use in connection with the fabrication of reconfigurable inductor 300 in a voltage regulator. Reconfigurable inductor 300 does not require a "high flux" density, so a low cost inductor can be used. Reconfigurable inductor 300 is not limited to an inductor having a particular inductance. In some embodiments, reconfigurable inductor 300 has a varying inductance between about 1.1 nano-henrys and about 0.3 nano-henrys, but can be reconfigured over any given inductance values.

In some embodiments, reconfigurable inductor 300 includes a core (e.g., inductor core 302). Inductor core 302 is not limited to a particular type of core material. Although inductor core 302 is shown as a magnetic core, other core materials may also be used with similar results (as shown in FIG. 5A-B), such as iron core, ferrite core, metals core, laminated metals core, air core, or any other core material. The switch (not shown) of conductive control ring 301 is not limited to a particular type of switch. The switch can include a FET switch, a MEMS switch, a carbon nanotubes (CNTs) switch, or any other type of switch circuit.

FIGS. 4A-B are detailed block diagrams illustrating a reconfigurable inductor with a conductive control ring in an off position and an on position, respectively, according to some embodiments. It is pointed out that the components of FIGS. 4A-B that have the same reference numbers (or names) as components of any other figure can operate or function in any manner similar to that described herein, but are not limited to such. According to this detailed exemplary embodiment, the inductance value of reconfigurable inductor 405 (as shown in system 400) is changed in a real time setting to a lower inductance value (as shown in system 410) by manipulating the magnetic flux 406 in the inductor with an appropriately placed conductive control ring 401, which is loaded by switch 403.

Referring now to FIG. 4A, system 400 includes reconfigurable inductor 405 when conductive control ring 401 is in an off state. Reconfigurable inductor 405 includes conductive control ring 401, inductor core 402, switch 403, inductor winding 404, and magnetic flux 406. According to system 400, the inductance of reconfigurable inductor 405 when conductive control ring 401 is in the off state ($L_{OFF}$) can be written as equation (1)

$$L_{OFF} = N^2 \mu_r A \frac{1}{d} = N^2 \mu_r A \frac{1}{d_1 + d_2 + d_3}$$

where $L_{OFF}$=Inductance in henries (H) when a conductive control ring is off, N=number of turns, $\mu_r$=Permeability of conductive control ring, A=Area of cross-sectional in square meters (m$^2$), d=Length in meters (m), where d is the total of $d_1+d_2+d_3$. However, referring now to FIG. 4B, system 410 includes reconfigurable inductor 405 when conductive control ring is an on state. According to system 410, the inductance of reconfigurable inductor 405 when conductive control ring 401 is in the on state ($L_{ON}$) can be written as equation (2)

$$L_{ON} = N^2 \mu_r A \frac{1}{d_1 + d_2 + \frac{\mu_r}{\mu_d} d_3}$$

where $L_{ON}$=Inductance in henries (H) when a conductive control ring is on, and $\mu_d$=Diamagnetic permeability (or other opposing permeability). According to one embodiment, switch 403 effectively controls the ability of conductive control ring 401 to change the magnetic flux 406 within reconfigurable inductor 405. Therefore, switches control the inductance of the reconfigurable inductor. For example, when switch 403 is loaded and in the on state, conductive control ring 403 is closed (on) and therefore allows current to run in a parallel direction with the current of the inductor. In this example, conductive control ring 401 is configured to cause a strong diamagnetic region of space (as shown in exemplary $d_3$), where the diamagnetic permeability ($\mu_d$), for example, is roughly close to 0. Note that $\mu_d$ may be a diamagnetic permeability or any other opposing field permeability according to some embodiments. Alternatively, when switch 403 is in the off state, conductive control ring 401 has no induced electric current and therefore the inductance of the reconfigurable inductor 405 is minimally affected by the region of space and location of the conductive control ring, as shown in FIG. 4A.

The inductance when switch 403 is in the off state ($L_{OFF}$) is larger than the inductance when the switch 403 is the on state ($L_{ON}$), since the ratio ($\mu_r/\mu_d$) is larger than 1 and accordingly the denominator in equation (2) is larger than the denominator in equation (1). Therefore, this control of the magnetic flux 406 allows reconfigurable inductor 405 to change its inductance in a real time setting (i.e., arbitrarily instantaneously change from a maximum inductance value (L0) to a zero inductance or any configured inductance value in between). In other words, this control of magnetic flux allows the reconfigurable inductor to change its inductance in a real time setting based on a size of the conductive control ring (i.e., the adjustable enclosed area of the inductor), which controls and is proportional to the ratio of ($\mu_r/\mu_d$).

Note that according to some alternative embodiments, the reconfigurable inductor, conductive control ring, and switch can be configured to operate with opposite logic configurations. For example, in alternative embodiments, a maximum inductance (L0) of a reconfigurable inductor may be implemented when the first switch is in the on state, or a reconfigurable inductor can be configured to have a lower inductance value when the first switch is in the on state, and thus have a higher inductance value when the switch is switched to its off state, etc.

FIG. 5A is a front view of a reconfigurable inductor with one or more conductive control rings and switches according to one embodiment; and FIG. 5B is an isotropic view of a reconfigurable inductor with one or more conductive control rings and switches according to one embodiment. As shown in FIGS. 5A-B, for example, reconfigurable inductor 500 is a one-turn inductor that includes inductor shield 504, inductor core 503, and two parallel conductive control rings 501-502, where each conductive control ring 501 and 502 includes three nested switches 505 and 506, respectively. Note that conductive control rings 501-502 are placed in parallel to each other, however the conductive control rings can be designed/placed in any configuration.

Inductor shield 504 is not limited to a particular type of inductor or material. Any shielding material capable of inducing a magnetic flux is suitable for use in connection with the fabrication of the reconfigurable inductor 500. Furthermore, switches 505-506 are controlled by software or logic (e.g., voltage regulator 105). In one embodiment, switches 505-506 are controlled (i.e., opened/closed) in parallel with one another (as shown in FIG. 6A), but are not limited to any particular configuration.

Figures 6A, 6B:
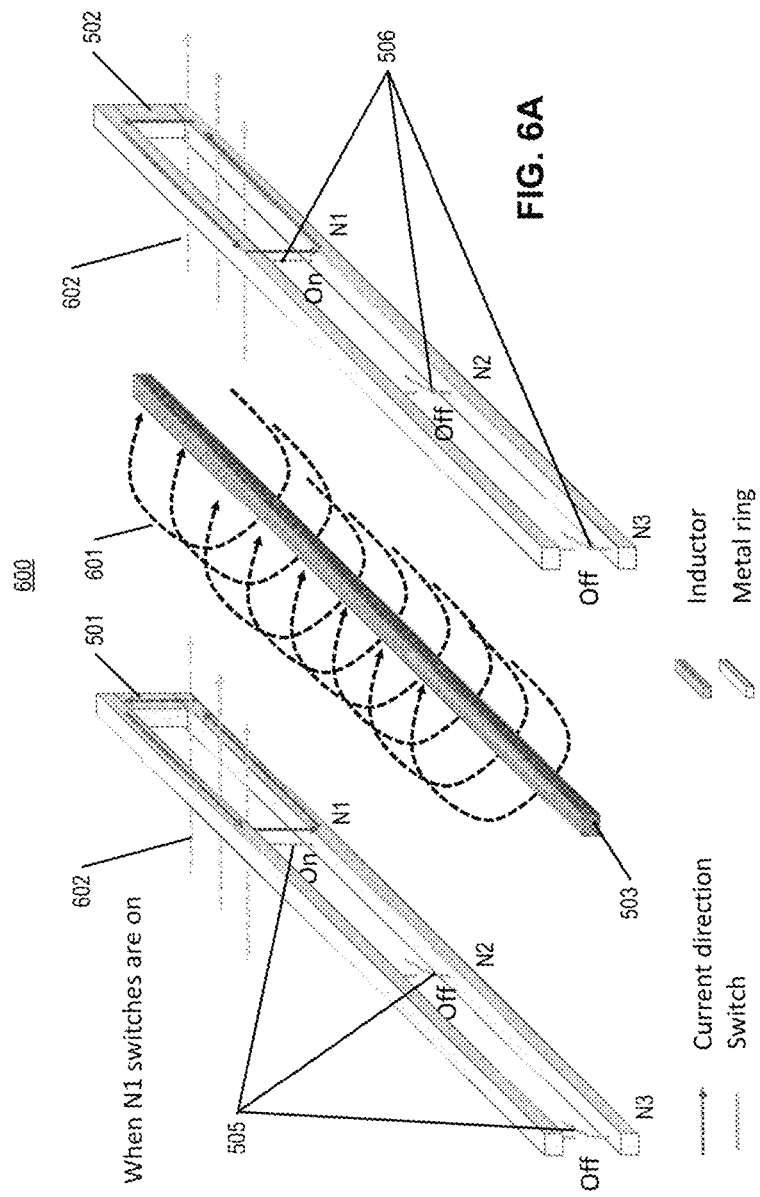
FIG. 6A is a perspective view of a block diagram illustrating a reconfigurable inductor with one or more conductive control rings and switches according to one embodiment.
FIG. 6B is a table illustrating a varying inductance of a reconfigurable inductor based on a pair of switches in one or more states according to one embodiment.

FIG. 6A is a perspective view of a block diagram illustrating a reconfigurable inductor with one or more conductive control rings and switches according to one embodiment; and FIG. 6B is a table illustrating a varying inductance of a reconfigurable inductor based on a pair of switches in one or more states according to one embodiment. It is pointed out that the components of FIG. 6A that have the same reference numbers (or names) as components of any other figure can operate or function in any manner similar to that described herein, but are not limited to such. Note that the inductor shield (as shown in FIGS. 5A-B) is not shown in FIG. 6A to facilitate visualization of the system, specifically the magnetic and diamagnetic fluxes.

Referring now to FIG. 6A, reconfigurable inductor 600 includes inductor core 503, inductor magnetic filed 601, ring magnetic field 602, conductive control rings 501-502, where each conductive control ring 501 and 502 includes three nested switches 505 and 506, respectively. According to one embodiment, the inductance states obtained using conductive control rings 501-502, where N is the state of the 3 pair of switches (i.e., N1 is the first pair of switches, N2 is the second pair of switches, etc.). For example, N=0 is when each pair of switches (N1, N2, N3) is an OFF state, N=1 is when only the first pair of switches (N1) are an ON state, N=2 is when only the two pair of switch (N1 and N2) are in the ON state, etc. According to the embodiment shown in FIG. 6A, in the voltage regulator (VR) steady state reconfigurable inductor 600 operates in state N=0 for the lowest ripple, which increases efficiency and reduces VR output ripple. When a transient load change is detected (whether via a VID bus or a detection circuit for current sensing in the VR), the VR reconfigures the inductance state of reconfigurable inductor 600 to operate in state N=2 for a faster transient response (as shown in the FIG. 6B).

In one embodiment, when reconfigurable inductor 600 is N=1, the first pair of switches (N1) are closed and loaded with electric current. At N=1, the first pair of switches are loaded with electric current and create an enclosed area. The current flowing through the enclosed area of conductive control rings 501-502 cause ring magnetic field 602, which intersects inductor magnetic field 601. When both magnetic fields intersect, the magnetic fields generate a strong diamagnetic region of space (e.g., $\mu_d$ as shown in FIG. 5B) that reduces the inductance value of reconfigurable inductor 600 as shown in FIG. 6B.

Note that the enclosed area of a conductive control ring is adjustable. For example, at N=1, the conductive control ring has a first enclosed area controlled by the first pair of switches (N1), and accordingly the conductive control ring is adjusted to a second enclosed area at N=2, when N1 and N2 are in an ON state. Also note that N=2 creates the second enclosed area when N1 and N2 are in the ON state, but the second enclosed area can also be created/maintained by only switching N2 in an ON state (regardless of the state of N1). Therefore, as shown in FIGS. 6A-B, reconfigurable inductor 600 can provide both a low ripple and a faster transient response based on the transient load and the adjustable enclosed area.

FIG. 7A is a block diagram of an under voltage protection (UVP) comparator used to reduce undershoot in a current sensing VR according to one embodiment; and FIG. 7B is a block diagram of an over voltage protection (OVP) comparator used to reduce overshoot in a current sensing VR according to one embodiment. In one embodiment, the comparators are configured to operate/trigger at fast detection speed when there is a heavy transient moment in a current sensing VR mode. During a load transient moment, the detection comparators either send an UVP output or an OVP output to the reconfigurable inductors using either an AVP enabled VR or a non-AVP mode VR.

Figure 8A:
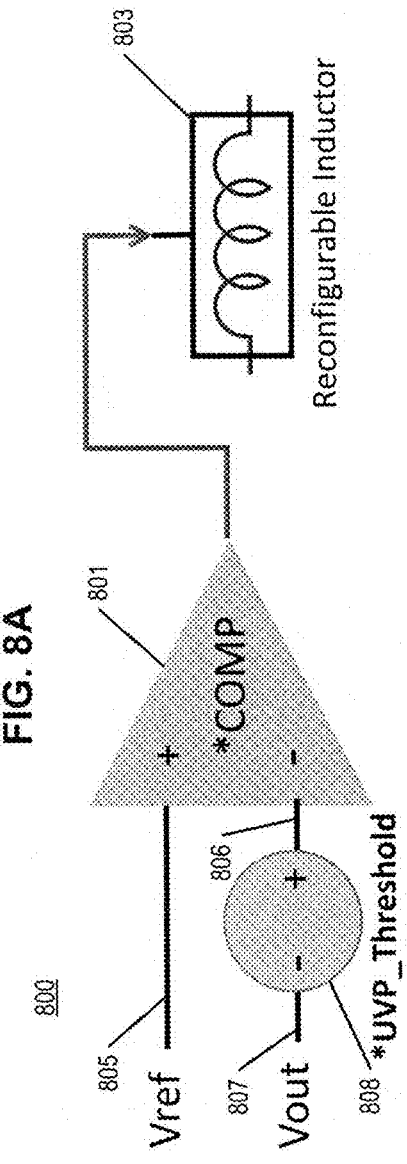
FIG. 8A is a block diagram of a UVP comparator used to reduce undershoot in a voltage sensing VR according to one embodiment.
Figure 8B:
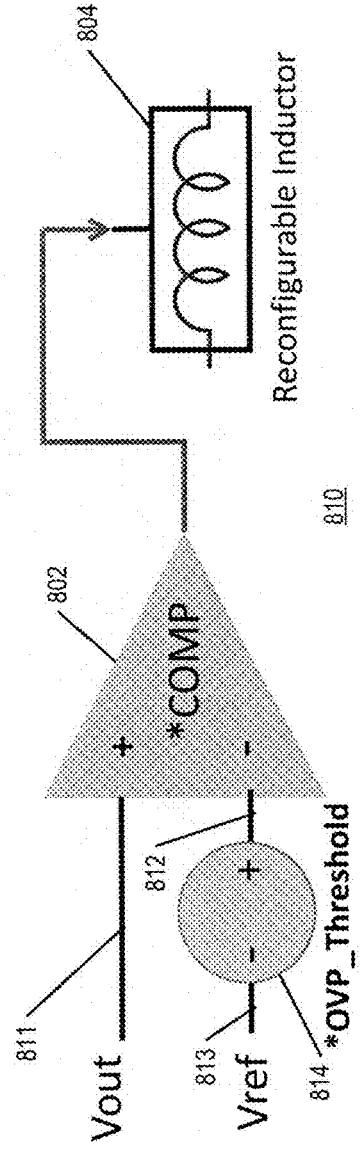
FIG. 8B is a block diagram of an OVP comparator used to reduce overshoot in a voltage sensing VR according to one embodiment.

During a steady state condition in the VR, a reconfigurable inductor is set to steady-state optimized inductance (e.g., L0), which operates for the lower ripple voltage. However, at a load transient moment, the OVP/UVP comparator sends a controlling signal (e.g., control bits 106) to the reconfigurable inductor to change and lower the inductance value, which provides a faster transient recovery. Also note that the comparators illustrated in FIGS. 7 and 8 are utilized for a time window generator during a bi-directional load transient in a current sensing VR converter (as shown FIG. 7A-B) and a voltage sensing VR converter (as shown in FIG. 8A-B). Furthermore, the detection comparators are op-amps (operational amplifiers), each having a non-inverting terminal and an inverting terminal.

Referring now to FIG. 7A. FIG. 7A illustrates a circuit diagram 700 of UVP comparator 701 in a current sensing VR that detects a load transient and signals reconfigurable inductor 703 during the load transient moment. In one embodiment, UVP comparator 701 compares a first reference voltage 705 and a second reference voltage 706 (e.g., Vsense). According to one embodiment, a non-inverting terminal of UVP comparator 701 receives the first reference voltage 705 (e.g., (VID−(LoadLine×Isense$_{AVG}$)) and an inverting terminal of UVP comparator 701 receives the second reference voltage 706, which includes a VR output voltage at a load sense point (Vsense). The first reference voltage 705 is coupled to a reference voltage 707 and an UVP offset 708 (UVP_Offset). The reference voltage 707 includes a VID output, a loadline value, and a sensed average inductor current from a power stage (Isense$_{AVG}$), where the loadline is defined as the absolute value of a delta value of the sensed voltage at a remote load point (ΔVsense) while the total loading current is changing (ΔI$_{load}$). The UVP offset 708 is configured and used to prevent faulty triggering.

Reconfigurable inductor 703 receives a control signal from an output terminal of UVP comparator 701 to control a switch in the inductor. The control signal either maintains the switch in an off state (inductance stays the same) or switches the switch in an on state (inductance is lowered). Therefore, if the first reference voltage (VID−LoadLine× Isense$_{AVG}$) is lower than the second reference voltage (Vsense), the switch is maintained in an off state. If the first reference voltage (VID−LoadLine×Isense$_{AVG}$) is greater than the second reference voltage (Vsense), the switch is switched to an on state to reduce undershoot and improve the transient response in the VR circuit.

Referring now to FIG. 7B. FIG. 7B illustrates a circuit diagram 710 of OVP comparator 702 in a current sensing VR that detects a load transient and signals reconfigurable inductor 704 during the load transient moment. In one embodiment, OVP comparator 702 compares a third reference voltage 711 and a fourth reference voltage 712. According to one embodiment, a non-inverting terminal of OVP comparator 702 receives the third reference voltage 711 (Vsense) and an inverting terminal of OVP comparator 702 receives the fourth reference voltage 712, which includes a VID output 713 (VID) and an OVP threshold 714 (OVP_Threshold).

Reconfigurable inductor 704 receives a control signal from an output terminal of OVP comparator 702 to control a switch in the inductor. Therefore, if the third reference voltage (Vsense) is lower than the fourth reference voltage (VID+OVP_Threshold), the switch is maintained in an off state. If the third reference voltage (Vsense) is greater than the second reference voltage (VID+OVP_Threshold), the switch is switched to an on state to help discharge faster and reduce overshoot in the VR circuit. In another embodiment, circuit diagrams 700 and 710 can also include a hysteresis comparator to implement a hysteretic rise/fall triggering thresholds. Note that reconfigurable inductors 703-704 are described as two separate inductors, but are not limited to such configuration. Note that circuit diagrams 700 and 710 including the comparators, offsets, and thresholds can be implemented in an analog domain or a fully quantized/digitized domain.

FIG. 8A is a block diagram of an UVP comparator used to reduce undershoot in a voltage sensing VR according to one embodiment; and FIG. 8B is a block diagram of an OVP comparator used to reduce overshoot in a voltage sensing VR according to one embodiment. Referring now to FIG. 8A. Referring now to FIG. 8A. FIG. 8A illustrates a circuit diagram 800 of UVP comparator 801 in a current sensing VR that detects a load transient and signals reconfigurable inductor 803 during the load transient moment. In one embodiment, UVP comparator 801 compares a first reference voltage 805 (e.g., Vref) and a second reference voltage 806. For example, the first reference voltage may be a target voltage output. According to one embodiment, a non-inverting terminal of UVP comparator 801 receives the first reference voltage 805 (Vref) and an inverting terminal of UVP comparator 801 receives the second reference voltage 806, which includes a VR output voltage 807 (e.g., Vout). The second reference voltage 806 is coupled to the VR output voltage 807 and an UVP threshold 808 (UVP_Threshold).

Reconfigurable inductor 803 receives a control signal from an output terminal of UVP comparator 801 to control a switch in the inductor. The control signal either maintains the switch in an off state (inductance stays the same) or switches the switch in an on state (inductance is lowered). Therefore, if the first reference voltage (Vref) is lower than the second reference voltage (Vout+UVP_Threshold), the switch is maintained in an off state. If the first reference voltage (Vref) is greater than the second reference voltage (Vout+UVP_Threshold), the switch is switched to an on state to reduce undershoot and improve the transient response in the VR circuit.

Referring now to FIG. 8B. FIG. 8B illustrates a circuit diagram 810 of OVP comparator 802 in a current sensing VR that detects a load transient and signals reconfigurable inductor 804 during the load transient moment. In one embodiment, OVP comparator 802 compares a third reference voltage 811 (e.g., Vout) and a fourth reference voltage 812. According to one embodiment, a non-inverting terminal of OVP comparator 802 receives the third reference voltage 811 (Vout) and an inverting terminal of OVP comparator 802 receives the fourth reference voltage 812, which includes a reference voltage 813 (Vref) and an OVP threshold 814 (OVP_Threshold).

Reconfigurable inductor 804 receives a control signal from an output terminal of OVP comparator 802 to control a switch in the inductor. Therefore, if the third reference voltage (Vout) is lower than the fourth reference voltage (Vref+OVP_Threshold), the switch is maintained in an off state. If the third reference voltage (Vout) is greater than the second reference voltage (Vref+OVP_Threshold), the switch is switched to an on state to help discharge faster and reduce overshoot in the VR circuit. In another embodiment, circuit diagrams 800 and 810 can also include a hysteresis comparator to implement a hysteretic rise/fall triggering thresholds. Note that reconfigurable inductors 803-804 are described as two separate inductors, but are not limited to such configuration. Note that circuit diagrams 800 and 810 including the comparators, offsets, and thresholds can be implemented in an analog domain or a fully quantized/digitized domain.

Figure 9:
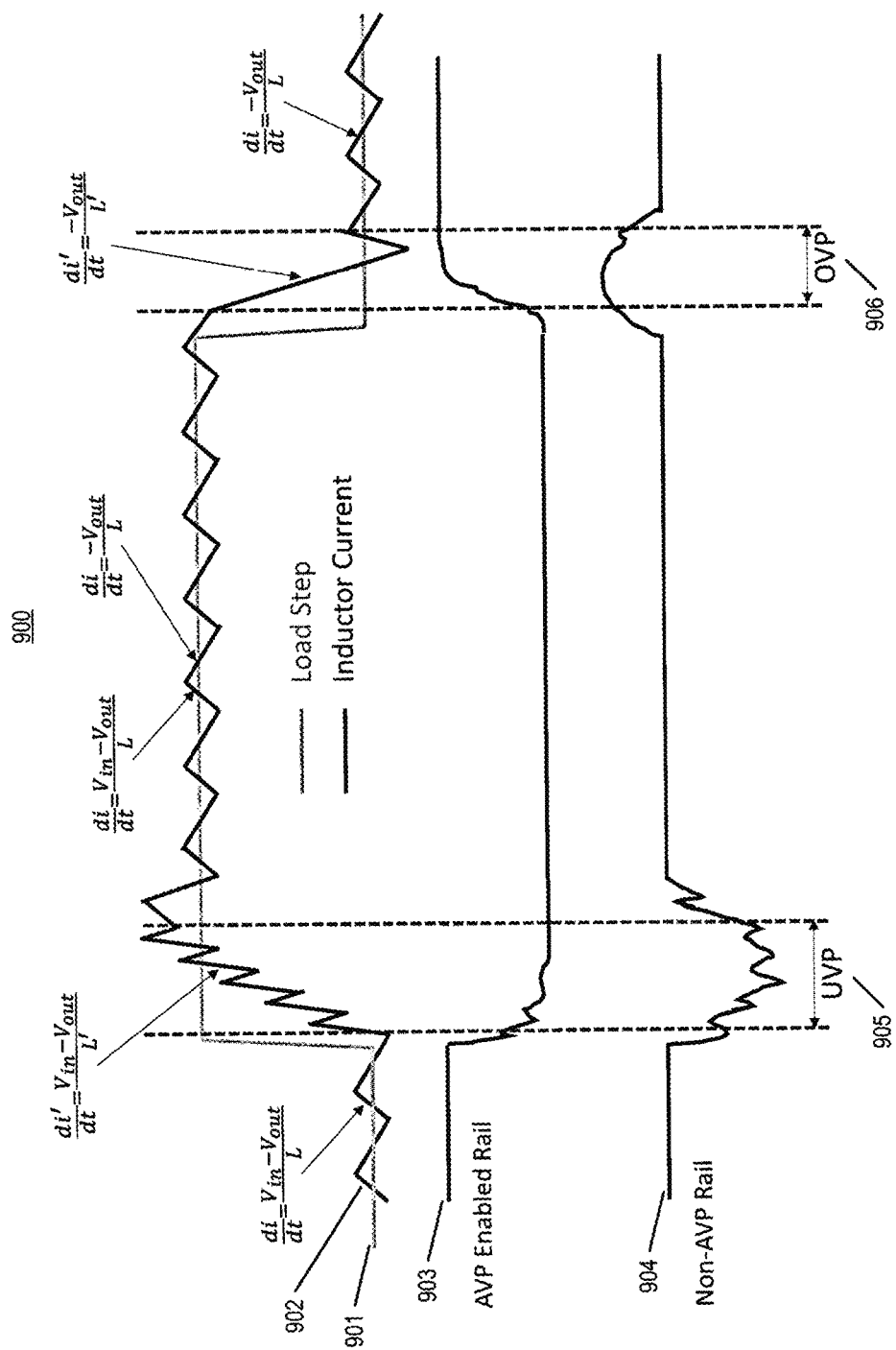
FIG. 9 is a graph of a UVP and OVP comparator time window illustrating a load step and a reconfigurable inductor current with an adaptive voltage positioning (AVP) enabled rail versus a non-AVP rail according to one embodiment.

FIG. 9 is a graph 900 of an UVP and OVP comparator time window. In one embodiment, FIG. 9 illustrates UVP and OVP comparators that generate a time window of UVP detection 905 and OVP detection 906, where a reconfigurable inductor (L) is reset to a lower inductance (L') to provide a faster transient. Graph 900 includes load step 901 and reconfigurable inductor current 902 depicted on AVP enabled rail 903 and non-AVP rail 904.

According to one embodiment, graph 900 illustrates an UVP and OVP time window that applies a lower inductance (L') to a steady-state optimized inductance (L) of a reconfigurable inductor at a load transient moment. In a light to heavy load transient, a lower inductance value provides a faster voltage recovery during a load transient moment by boosting the reconfigurable inductor current slew (di'/dt). Alternatively, in a heavy to light load transient, lowering inductance (L') provides a faster discharge of the reconfigurable inductor current. In one embodiment, a voltage regulator can use a hysteresis comparator to monitor the switch noise and/or a switched capacitor comparator to cancel and/or reduce the offset voltage each cycle. Note that graph 900 summarizes a comparative simulation using different inductor reconfigurations at various transient moments.

Figure 10:
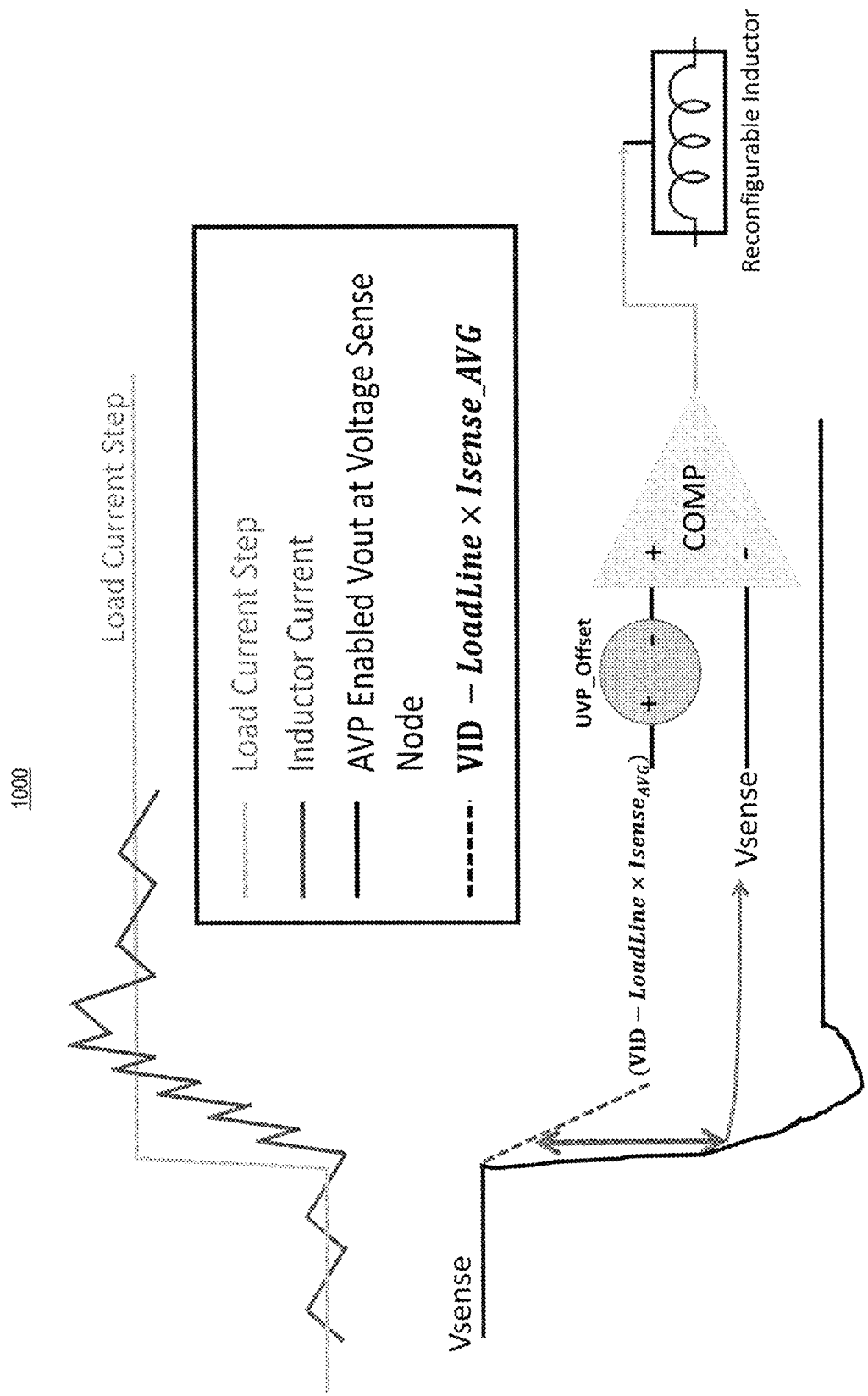
FIG. 10 is a detailed graph illustrating a transient detection with a reconfigurable inductor in a current sensing VR according to one embodiment.

FIG. 10 is a detailed graph 1000 illustrating a transient detection with a reconfigurable inductor in a current sensing VR according to one embodiment. Specifically, FIG. 10 illustrates an undervoltage protection that enables a reconfigurable inductor to be lower, while a comparator triggers in a current sensing VR. Note that FIG. 10 is a detailed graph illustrating the operation of a UVP comparator in a current sensing VR (as shown in FIG. 7A). In one embodiment, the non-inverting terminal input of the comparator is referenced as "VID−LoadLine*IsenseAVG−UVP_Offset". The "VID", "LoadLine", and "UVP_Offset" are user-defined preset constants, but each of these values can be a variable in some embodiments. The "Isense_AVG" is a sensed inductor average current from either a power stage(s) or a controller.

As such, in one embodiment, the comparator is configured to trigger at heavy load transients. Since the sensed average load current is determined at the reconfigurable inductor, "Isense_AVG" is generally smaller than an actual load current at a heavy transient, but generally the same value as the load current at a steady state. Therefore, reconfiguring the inductor to have a lower inductance value at a heavy transient helps reduce undershoot. Accordingly, the reconfigurbale inductance value returns back to the normal inductance value at a steady state by using the detection logic.

Figure 11:
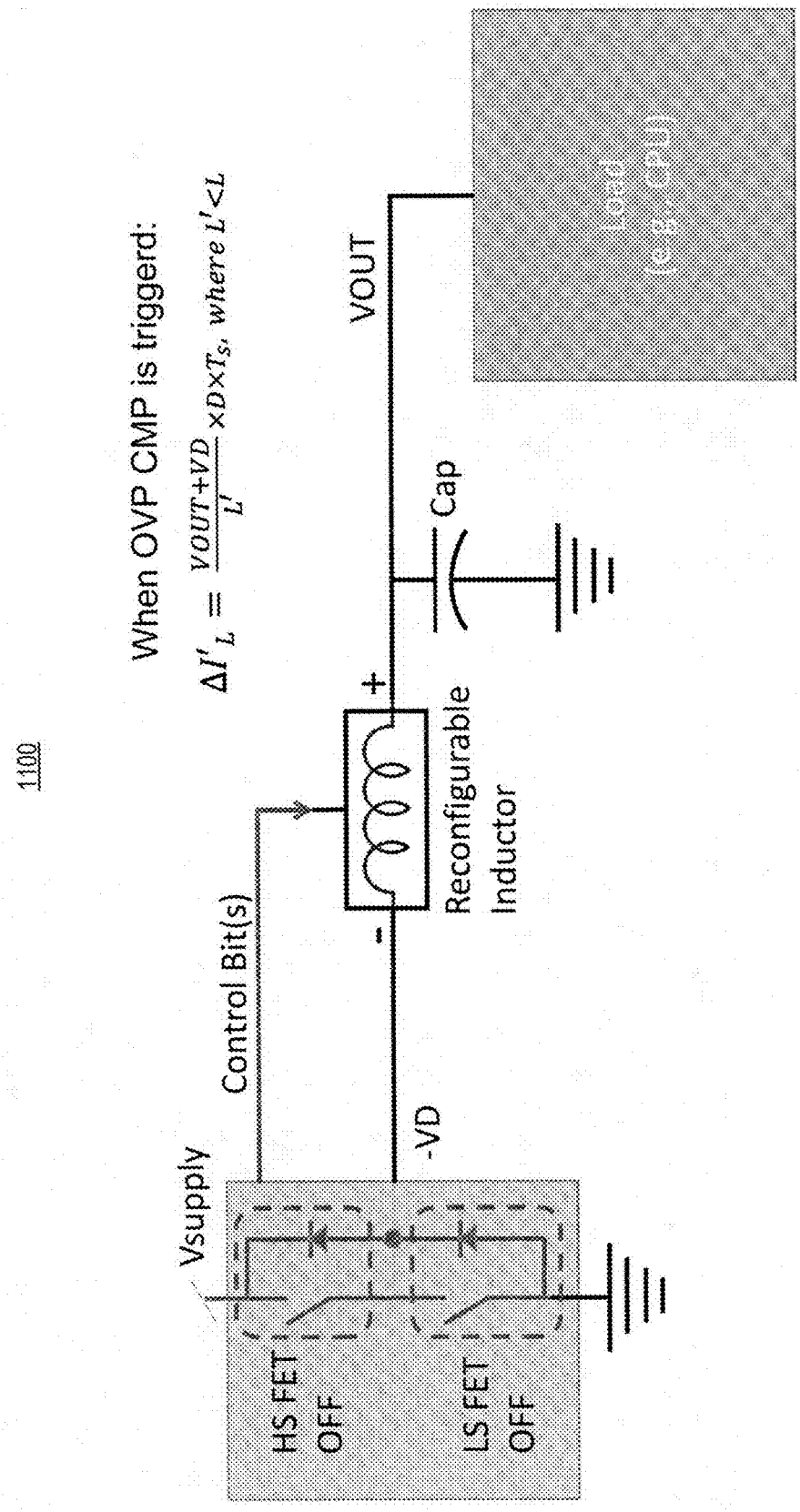
FIG. 11 is an OVP circuit diagram with a reconfigurable inductor according to one embodiment.

FIG. 11 is an OVP circuit diagram with a reconfigurable inductor according to one embodiment. As such, FIG. 11 illustrates an overshoot protection configuration by lowering inductance (L') during a load transient moment. System 1100 illustrates a detailed circuit diagram that shows how a lower inductance value in the reconfigurable inductor helps discharge the inductor current during overshoot conditions. When an OVP signal is generated from using an OVP comparator, both high side FET and low side FET are turned off. In a conventional VR circuit diagram, voltage across an inductor is applied (Vout+VD), where VD is the low side FET forward voltage drop of a flyback diode, and discharges at the rate of $\Delta I_L = Vout + VD/L \times D \times T_S$ if the inductor is not reconfigured. However, by resetting to a lower inductance value L' using the reconfigurable inductor, the discharge rate $\Delta I'_L = Vout + VD/L' \times D \times T_S$ is higher with the lower inductance (L'<L) such that overshoot is further reduced.

Figure 12:
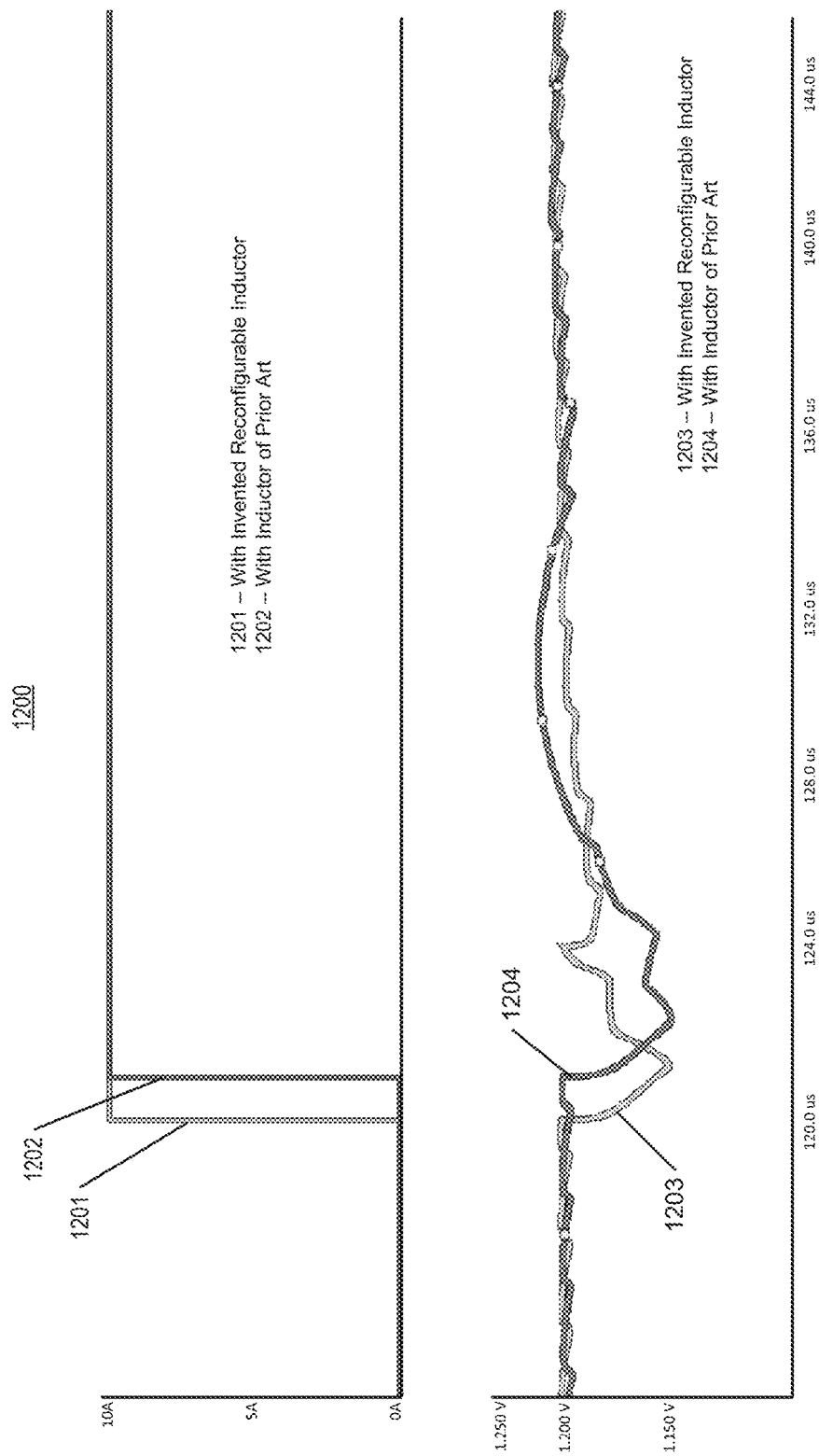
FIG. 12 is a detailed graph illustrating a conventional load step versus a load with a reconfigurable inductor, and the respective conventional voltage output versus the respective voltage output with the reconfigurable inductor in order to reduce undershoot according to one embodiment.

FIG. 12 is a detailed graph 1200 illustrating a conventional load step 1202 (I2) versus a load using a reconfigurable inductor 1201 (I1), and the conventional voltage output 1104 (VOUT2) versus the voltage output using the reconfigurable inductor 1203 (VOUT1). In one embodiment, graph 1200 shows that the undershoot voltage is reduced using the reconfigurable inductor.

For example, graph 1200 illustrates a comparison study between a conventional inductor with a fixed inductance and a reconfigurable inductor (e.g., reconfigurable inductor 101) in a single-phase step down switched VR, which has been conducted in PSPICE according to one embodiment. Continuing with the above example, an inductor with a 1.1 uH inductance and a reconfigurable inductor with an inductance range of 1.1 uH to 0.7 uH are used in the simulation under a 10 A/10 nsec step loading current. As shown in graph 1200, this applied step current and the 1.2V regulator output (12V input) are plot accordingly. The first row shows the applied loading step current for each inductor with the same output 1.2V. The I1 10A load step (1201) is applied and the VR VOUT1 output response 1203 is accordingly plotted in the second row using the reconfigurable inductor. Alternatively, the I2 10A load step (1202) is applied to the same VR and its VOUT2 response 1204 is accordingly plotted in the second row with a conventional inductor of fixed 1.1 uH inductance.

According to one embodiment, in a steady state, VR works with a 1.1 uH inductor but changes to 0.7 uH inductor, using the reconfigurable inductor, once heavy loading or voltage droop is detected. Therefore, as shown in the second row of graph 1200, VOUT1 of the reconfigurable inductor 1203 has a faster transient and recovery with no overshoot as compared to VOUT2 of the conventional 1.1 uH fixed inductor 1104 (as shown by time interval 127.0 us-134.0 us).

In one embodiment, the reconfigurable inductor current slope obeys $\Delta i = (V/L) * \Delta t$, where i is inductor current, V is voltage across the inductor, L is inductance, and t is time. Thus, with a lower inductance (0.7 uH) under a given pulse width modulation (PWM) duty cycle, a higher slew rate of the reconfigurable inductor current enables the faster Vdroop recovery. Alternatively, when the detection logic detects a lower error again, it controls the reconfigurable inductor and reconfigures to the 1.1 uH inductor, which provides a low ripple.

Figure 13:
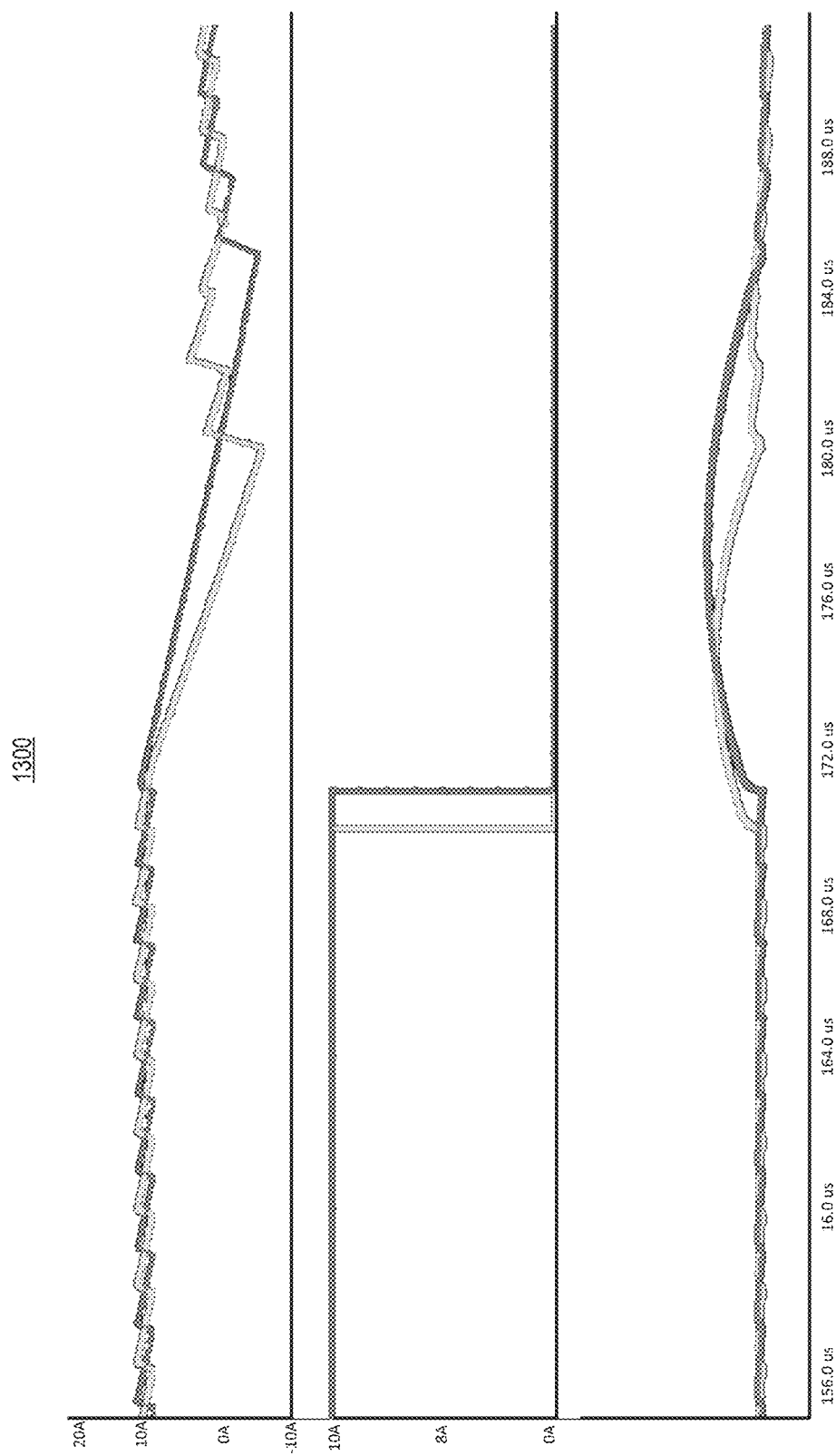
FIG. 13 is a detailed graph illustrating an overshoot reduction comparison of a conventional inductor versus a reconfigurable inductor according to one embodiment.

FIG. 13 is a detailed graph illustrating an overshoot reduction comparison of a conventional inductor (1.1 uH inductance) versus a reconfigurable inductor (1.1 uH to 0.7 uH inductance) according to one embodiment. Graph 1300 illustrates an overshoot comparison: 1.1 uH non-reconfigurable inductor (red) has a slower transient speed than a reconfigurable inductor (green). Accordingly, as shown in graph 1300, setting the reconfigurable inductor to 0.7 uH helps reduce overshoot and provides faster transient.

FIG. 14 is a table illustrating an overshoot voltage (V) and an overshoot duration (uSec) improving with one or more reconfigurable inductor values according to one embodiment. Table 1400 illustrates a simulated overshoot voltage 1401 and an overshoot duration 1402, where each of them improves with different inductor configurations. For example, 1.1 uH to 0.3 uH inductor reduces the overshoot voltage and provides faster transient as compared to 1.1 uH inductor or the 1.1 uH to 0.7 uH reconfigurable inductor.

Accordingly, table 1300 summarizes an overshoot comparison using different inductor reconfigurations at various transient moments.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

The following examples pertain to further embodiments:

A voltage regulator, comprising, a reconfigurable inductor, and the reconfigurable inductor having a conductive control ring, the conductive control ring having an adjustable enclosed area controlled by at least a first switch, wherein the reconfigurable inductor has a varying inductance based on a state of at least the first switch and the adjustable enclosed area of the conductive control ring.

A voltage regulator, comprising, a reconfigurable inductor, the reconfigurable inductor having a conductive control ring, the conductive control ring having an adjustable enclosed area controlled by at least a first switch, wherein the reconfigurable inductor has a varying inductance based on a state of at least the first switch and the adjustable enclosed area of the conductive control ring, and wherein the reconfigurable inductor is coupled between a power supply and a load, and receives electrical power from the power supply and provides electrical power to the load.

A voltage regulator, comprising, a reconfigurable inductor, the reconfigurable inductor having a conductive control ring, the conductive control ring having an adjustable enclosed area controlled by at least a first switch, wherein the reconfigurable inductor has a varying inductance based on a state of at least the first switch and the adjustable enclosed area of the conductive control ring, wherein the reconfigurable inductor is coupled between a power supply and a load, and receives electrical power from the power supply and provides electrical power to the load, and wherein the state of the first switch comprises an on state when the first switch is closed and an off state when the first switch is open.

A voltage regulator, comprising, a reconfigurable inductor, the reconfigurable inductor having a conductive control ring, the conductive control ring having an adjustable enclosed area controlled by at least a first switch, wherein the reconfigurable inductor has a varying inductance based on a state of at least the first switch and the adjustable enclosed area of the conductive control ring, wherein the reconfigurable inductor is coupled between a power supply and a load, and receives electrical power from the power supply and provides electrical power to the load, wherein the state of the first switch comprises an on state when the first switch is closed and an off state when the first switch is open, and wherein the controller is configured to control the state of the first switch to vary inductance of the reconfigurable inductor based on a size of the adjustable enclosed area when at least the first switch is in the on state.

A voltage regulator, comprising, a reconfigurable inductor, the reconfigurable inductor having a conductive control ring, the conductive control ring having an adjustable enclosed area controlled by at least a first switch, wherein the reconfigurable inductor has a varying inductance based on a state of at least the first switch and the adjustable enclosed area of the conductive control ring, wherein the conductive control ring comprises a plurality of switches, wherein the reconfigurable inductor is coupled between a power supply and a load, and receives electrical power from the power supply and provides electrical power to the load, wherein the state of the first switch comprises an on state when the first switch is closed and an off state when the first switch is open, wherein the controller is configured to control the state of the first switch to vary inductance of the reconfigurable inductor based on a size of the adjustable enclosed area when at least the first switch is in the on state, and wherein the reconfigurable inductor has a maximum inductance when each switch of the conductive control ring is in the off state, and is configured to create more than one inductance values based on the plurality of switches that are in the on state.

A voltage regulator, comprising, a reconfigurable inductor, the reconfigurable inductor having a conductive control ring, the conductive control ring having an adjustable enclosed area controlled by at least a first switch, wherein the reconfigurable inductor has a varying inductance based on a state of at least the first switch and the adjustable enclosed area of the conductive control ring, and wherein the adjustable enclosed area of the conductive control ring is controlled based on the plurality of switches that are in the on state.

A voltage regulator, comprising, a reconfigurable inductor, the reconfigurable inductor having a conductive control ring, the conductive control ring having an adjustable enclosed area controlled by at least a first switch, wherein the reconfigurable inductor has a varying inductance based on a state of at least the first switch and the adjustable enclosed area of the conductive control ring, wherein the reconfigurable inductor is coupled between a power supply and a load, and receives electrical power from the power supply and provides electrical power to the load, and wherein the reconfigurable inductor is configured to generate magnetic field lines when current flows through the inductor, and wherein the adjustable enclosed area is configured to generate opposing field lines to intersect with the magnetic field lines when a current flows through the conductive control ring and at least the first switch is in the on state.

A voltage regulator, comprising, a reconfigurable inductor, the reconfigurable inductor having a conductive control ring, the conductive control ring having an adjustable enclosed area controlled by at least a first switch, wherein the reconfigurable inductor has a varying inductance based on a state of at least the first switch and the adjustable enclosed area of the conductive control ring, wherein the reconfigurable inductor is coupled between a power supply and a load, and receives electrical power from the power supply and provides electrical power to the load, and wherein the reconfigurable inductor is configured to generate magnetic field lines when current flows through the inductor, wherein the adjustable enclosed area is configured to generate opposing field lines to intersect with the magnetic field lines when a current flows through the conductive control ring and at least the first switch is in the on state, and wherein the controller is configured to increase the adjustable enclosed area to cause the opposing field lines to increase a total opposing magnetic flux, and wherein the varying inductance of the reconfigurable inductor is decreased when the diamagnetic field lines are increased.

A voltage regulator, comprising, a reconfigurable inductor, the reconfigurable inductor having a conductive control ring, the conductive control ring having an adjustable enclosed area controlled by at least a first switch, wherein the reconfigurable inductor has a varying inductance based on a state of at least the first switch and the adjustable enclosed area of the conductive control ring, and wherein the varying inductance of the reconfigurable inductor is configured to vary inductance of the inductor over a range of inductance values, and wherein the reconfigurable inductor further comprises a plurality of conductive control rings.

A method to reduce undershoot in a switching voltage regulator using a reconfigurable inductor during a load transient moment, the method comprising, determining whether the switching voltage regulator is operating in a voltage sensing voltage regulator (VR) mode or a current sensing VR mode; if the switching voltage regulator is operating in the voltage sensing VR mode, determining whether a first reference voltage is greater than a second reference voltage, wherein the step of determining in the voltage sensing VR mode further comprises: maintaining a first switch in a reconfigurable inductor in an off state when the first reference voltage is not greater than the second reference voltage, and maintaining the first switch in the reconfigurable inductor in an on state when the first reference voltage is greater than the second reference voltage; and if the switching voltage regulator is operating in the current sensing VR mode, determining whether a third reference voltage is greater than a fourth reference voltage, wherein the step of determining in the current sensing VR further comprises: maintaining the first switch in a reconfigurable inductor in an off state when the third reference voltage is not greater than the fourth reference voltage, and maintaining the first switch in the reconfigurable inductor in an on state when the third reference voltage is greater than the fourth reference voltage.

A method to reduce undershoot in a switching voltage regulator using a reconfigurable inductor during a load transient moment, the method comprising, determining whether the switching voltage regulator is operating in a voltage sensing voltage regulator (VR) mode or a current sensing VR mode; if the switching voltage regulator is operating in the voltage sensing VR mode, determining whether a first reference voltage is greater than a second reference voltage, wherein the second reference voltage comprises an output voltage and an under voltage protection threshold, and wherein the step of determining in the voltage sensing VR mode further comprises: maintaining a first switch in a reconfigurable inductor in an off state when the first reference voltage is not greater than the second reference voltage, and maintaining the first switch in the reconfigurable inductor in an on state when the first reference voltage is greater than the second reference voltage; and if the switching voltage regulator is operating in the current sensing VR mode, determining whether a third reference voltage is greater than a fourth reference voltage, wherein the step of determining in the current sensing VR further comprises: maintaining the first switch in a reconfigurable inductor in an off state when the third reference voltage is not greater than the fourth reference voltage, and maintaining the first switch in the reconfigurable inductor in an on state when the third reference voltage is greater than the fourth reference voltage.

A method to reduce undershoot in a switching voltage regulator using a reconfigurable inductor during a load transient moment, the method comprising, determining whether the switching voltage regulator is operating in a voltage sensing voltage regulator (VR) mode or a current sensing VR mode; if the switching voltage regulator is operating in the voltage sensing VR mode, determining whether a first reference voltage is greater than a second reference voltage, wherein the step of determining in the voltage sensing VR mode further comprises: maintaining a first switch in a reconfigurable inductor in an off state when the first reference voltage is not greater than the second reference voltage, and maintaining the first switch in the reconfigurable inductor in an on state when the first reference voltage is greater than the second reference voltage; and if the switching voltage regulator is operating in the current sensing VR mode, determining whether a third reference voltage is greater than a fourth reference voltage, wherein the third reference voltage comprises a voltage identification output, a load line value, and an under voltage protection offset, and wherein the step of determining in the current sensing VR further comprises: maintaining the first switch in a reconfigurable inductor in an off state when the third reference voltage is not greater than the fourth reference voltage, and maintaining the first switch in the reconfigurable inductor in an on state when the third reference voltage is greater than the fourth reference voltage.

A method to reduce undershoot in a switching voltage regulator using a reconfigurable inductor during a load transient moment, the method comprising, determining whether the switching voltage regulator is operating in a voltage sensing voltage regulator (VR) mode or a current sensing VR mode; if the switching voltage regulator is operating in the voltage sensing VR mode, determining whether a first reference voltage is greater than a second reference voltage, wherein the step of determining in the voltage sensing VR mode further comprises: maintaining a first switch in a reconfigurable inductor in an off state when the first reference voltage is not greater than the second reference voltage, and maintaining the first switch in the reconfigurable inductor in an on state when the first reference voltage is greater than the second reference voltage; if the switching voltage regulator is operating in the current sensing VR mode, determining whether a third reference voltage is greater than a fourth reference voltage, wherein the step of determining in the current sensing VR further comprises: maintaining the first switch in a reconfigurable inductor in an off state when the third reference voltage is not greater than the fourth reference voltage, and maintaining the first switch in the reconfigurable inductor in an on state when the third reference voltage is greater than the fourth reference voltage; and if the switching voltage regulator is operating in the voltage sensing VR mode, detecting the load transient moment with a first comparator, the comparator having a first input terminal, a second input terminal, and an output terminal, the first input terminal coupled to the first reference voltage, the second input terminal coupled to the second reference voltage, and the output terminal coupled to the first switch in the reconfigurable inductor, wherein the output terminal is configured to generate a first control bit to trigger the first switch to the on state in response to the load transient moment and is configured to generate a second control bit to trigger the first switch to the off state to re-assert a steady state.

A method to reduce undershoot in a switching voltage regulator using a reconfigurable inductor during a load transient moment, the method comprising, determining whether the switching voltage regulator is operating in a voltage sensing voltage regulator (VR) mode or a current sensing VR mode; if the switching voltage regulator is operating in the voltage sensing VR mode, determining whether a first reference voltage is greater than a second reference voltage, wherein the step of determining in the voltage sensing VR mode further comprises: maintaining a first switch in a reconfigurable inductor in an off state when the first reference voltage is not greater than the second reference voltage, and maintaining the first switch in the reconfigurable inductor in an on state when the first reference voltage is greater than the second reference voltage; if the switching voltage regulator is operating in the current sensing VR mode, determining whether a third reference voltage is greater than a fourth reference voltage, wherein the step of determining in the current sensing VR further comprises: maintaining the first switch in a reconfigurable inductor in an off state when the third reference voltage is not greater than the fourth reference voltage, and maintaining the first switch in the reconfigurable inductor in an on state when the third reference voltage is greater than the fourth reference voltage; and if the switching voltage regulator is operating in the current sensing VR mode, detecting a load transient moment with a second comparator, the second comparator having a first input terminal, a second input terminal, and an output terminal, the first input terminal coupled to the third reference voltage, the second input terminal coupled to the fourth reference voltage, and the output terminal coupled to the first switch in the reconfigurable inductor, wherein the output terminal is configured to generate a first control bit to trigger the first switch to the on state in response to the load transient moment and is configured to generate a second control bit to trigger the first switch to the off state to re-assert a steady state.

A method to reduce undershoot in a switching voltage regulator using a reconfigurable inductor during a load transient moment, the method comprising, determining whether the switching voltage regulator is operating in a voltage sensing voltage regulator (VR) mode or a current sensing VR mode; if the switching voltage regulator is operating in the voltage sensing VR mode, determining whether a first reference voltage is greater than a second reference voltage, wherein the step of determining in the voltage sensing VR mode further comprises: maintaining a first switch in a reconfigurable inductor in an off state when the first reference voltage is not greater than the second reference voltage, and maintaining the first switch in the reconfigurable inductor in an on state when the first reference voltage is greater than the second reference voltage; if the switching voltage regulator is operating in the current sensing VR mode, determining whether a third reference voltage is greater than a fourth reference voltage, wherein the step of determining in the current sensing VR further comprises: maintaining the first switch in a reconfigurable inductor in an off state when the third reference voltage is not greater than the fourth reference voltage, and maintaining the first switch in the reconfigurable inductor in an on state when the third reference voltage is greater than the fourth reference voltage; and if the switching voltage regulator is operating in the voltage sensing VR mode, detecting the load transient moment with a first comparator, the comparator having a first input terminal, a second input terminal, and an output terminal, the first input terminal coupled to the first reference voltage, the second input terminal coupled to the second reference voltage, and the output terminal coupled to the first switch in the reconfigurable inductor, wherein the output terminal is configured to generate a first control bit to trigger the first switch to the on state in response to the load transient moment and is configured to generate a second control bit to trigger the first switch to the off state to re-assert a steady state, wherein the steady state of the reconfigurable inductor is proportional to the off state and is configured to provide a maximum inductance.

A method to reduce undershoot in a switching voltage regulator using a reconfigurable inductor during a load transient moment, the method comprising, determining whether the switching voltage regulator is operating in a voltage sensing voltage regulator (VR) mode or a current sensing VR mode; if the switching voltage regulator is operating in the voltage sensing VR mode, determining whether a first reference voltage is greater than a second reference voltage, wherein the step of determining in the voltage sensing VR mode further comprises: maintaining a first switch in a reconfigurable inductor in an off state when the first reference voltage is not greater than the second reference voltage, and maintaining the first switch in the reconfigurable inductor in an on state when the first reference voltage is greater than the second reference voltage; if the switching voltage regulator is operating in the current sensing VR mode, determining whether a third reference voltage is greater than a fourth reference voltage, wherein the step of determining in the current sensing VR further comprises: maintaining the first switch in a reconfigurable inductor in an off state when the third reference voltage is not greater than the fourth reference voltage, and maintaining the first switch in the reconfigurable inductor in an on state when the third reference voltage is greater than the fourth reference voltage; and wherein the on state of the reconfigurable inductor is configured to provide a reduced inductance value in response to the load transient moment.

A method to reduce undershoot in a switching voltage regulator using a reconfigurable inductor during a load transient moment, the method comprising, determining whether the switching voltage regulator is operating in a voltage sensing voltage regulator (VR) mode or a current sensing VR mode; if the switching voltage regulator is operating in the voltage sensing VR mode, determining whether a first reference voltage is greater than a second reference voltage, wherein the step of determining in the voltage sensing VR mode further comprises: maintaining a first switch in a reconfigurable inductor in an off state when the first reference voltage is not greater than the second reference voltage, and maintaining the first switch in the reconfigurable inductor in an on state when the first reference voltage is greater than the second reference voltage; and if the switching voltage regulator is operating in the current sensing VR mode: determining a sensed voltage at a load point, wherein the sensed voltage is coupled to a fourth reference voltage, determining a sensed inductor current in a power stage, and determining whether a third reference voltage is greater than the fourth reference voltage, wherein the step of determining in the current sensing VR further comprises: maintaining the first switch in a reconfigurable inductor in an off state when the third reference voltage is not greater than the fourth reference voltage, and maintaining the first switch in the reconfigurable inductor in an on state when the third reference voltage is greater than the fourth reference voltage.

A method to reduce overshoot in a switching voltage regulator using a reconfigurable inductor during a load transient moment, the method comprising, determining whether the switching voltage regulator is operating in a voltage sensing voltage regulator (VR) mode or a current sensing VR mode; if the switching voltage regulator is operating in the voltage sensing VR mode, determining whether a first reference voltage is greater than a second reference voltage, wherein the step of determining in the voltage sensing VR mode further comprises: maintaining a first switch in a reconfigurable inductor in an off state when the first reference voltage is not greater than the second reference voltage, and maintaining the first switch in the reconfigurable inductor in an on state when the first reference voltage is greater than the second reference voltage; and if the switching voltage regulator is operating in the current sensing VR mode, determining whether a third reference voltage is greater than a fourth reference voltage, wherein the step of determining in the current sensing VR further comprises: maintaining the first switch in a reconfigurable inductor in an off state when the third reference voltage is not greater than the fourth reference voltage, and maintaining the first switch in the reconfigurable inductor in an on state when the third reference voltage is greater than the fourth reference voltage.

A method to reduce overshoot in a switching voltage regulator using a reconfigurable inductor during a load transient moment, the method comprising, determining whether the switching voltage regulator is operating in a voltage sensing voltage regulator (VR) mode or a current sensing VR mode; if the switching voltage regulator is operating in the voltage sensing VR mode, determining whether a first reference voltage is greater than a second reference voltage, wherein the second reference voltage comprises a reference voltage and an over voltage protection threshold, and wherein the step of determining in the voltage sensing VR mode further comprises: maintaining a first switch in a reconfigurable inductor in an off state when the first reference voltage is not greater than the second reference voltage, and maintaining the first switch in the reconfigurable inductor in an on state when the first reference voltage is greater than the second reference voltage; and if the switching voltage regulator is operating in the current sensing VR mode, determining whether a third reference voltage is greater than a fourth reference voltage, wherein the step of determining in the current sensing VR further comprises: maintaining the first switch in a reconfigurable inductor in an off state when the third reference voltage is not greater than the fourth reference voltage, and maintaining the first switch in the reconfigurable inductor in an on state when the third reference voltage is greater than the fourth reference voltage.

A method to reduce overshoot in a switching voltage regulator using a reconfigurable inductor during a load transient moment, the method comprising, determining whether the switching voltage regulator is operating in a voltage sensing voltage regulator (VR) mode or a current sensing VR mode; if the switching voltage regulator is operating in the voltage sensing VR mode, determining whether a first reference voltage is greater than a second reference voltage, wherein the step of determining in the voltage sensing VR mode further comprises: maintaining a first switch in a reconfigurable inductor in an off state when the first reference voltage is not greater than the second reference voltage, and maintaining the first switch in the reconfigurable inductor in an on state when the first reference voltage is greater than the second reference voltage; and if the switching voltage regulator is operating in the current sensing VR mode, determining whether a third reference voltage is greater than a fourth reference voltage, wherein the fourth reference voltage comprises a voltage identification output and an over voltage protection threshold, and wherein the step of determining in the current sensing VR further comprises: maintaining the first switch in a reconfigurable inductor in an off state when the third reference voltage is not greater than the fourth reference voltage, and maintaining the first switch in the reconfigurable inductor in an on state when the third reference voltage is greater than the fourth reference voltage.

A method to reduce overshoot in a switching voltage regulator using a reconfigurable inductor during a load transient moment, the method comprising, determining whether the switching voltage regulator is operating in a voltage sensing voltage regulator (VR) mode or a current sensing VR mode; if the switching voltage regulator is operating in the voltage sensing VR mode, determining whether a first reference voltage is greater than a second reference voltage, wherein the step of determining in the voltage sensing VR mode further comprises: maintaining a first switch in a reconfigurable inductor in an off state when the first reference voltage is not greater than the second reference voltage, and maintaining the first switch in the reconfigurable inductor in an on state when the first reference voltage is greater than the second reference voltage; if the switching voltage regulator is operating in the current sensing VR mode, determining whether a third reference voltage is greater than a fourth reference voltage, wherein the step of determining in the current sensing VR further comprises: maintaining the first switch in a reconfigurable inductor in an off state when the third reference voltage is not greater than the fourth reference voltage, and maintaining the first switch in the reconfigurable inductor in an on state when the third reference voltage is greater than the fourth reference voltage; and if the switching voltage regulator is operating in the voltage sensing VR mode, detecting the load transient moment with a first comparator, the comparator having a first input terminal, a second input terminal, and an output terminal, the first input terminal coupled to the first reference voltage, the second input terminal coupled to the second reference voltage, and the output terminal coupled to the first switch in the reconfigurable inductor, wherein the output terminal is configured to generate a first control bit to trigger the first switch to the on state in response to the load transient moment and is configured to generate a second control bit to trigger the first switch to the off state to re-assert a steady state.

A method to reduce overshoot in a switching voltage regulator using a reconfigurable inductor during a load transient moment, the method comprising, determining whether the switching voltage regulator is operating in a voltage sensing voltage regulator (VR) mode or a current sensing VR mode; if the switching voltage regulator is operating in the voltage sensing VR mode, determining whether a first reference voltage is greater than a second reference voltage, wherein the step of determining in the voltage sensing VR mode further comprises: maintaining a first switch in a reconfigurable inductor in an off state when the first reference voltage is not greater than the second reference voltage, and maintaining the first switch in the reconfigurable inductor in an on state when the first reference voltage is greater than the second reference voltage; if the switching voltage regulator is operating in the current sensing VR mode, determining whether a third reference voltage is greater than a fourth reference voltage, wherein the step of determining in the current sensing VR further comprises: maintaining the first switch in a reconfigurable inductor in an off state when the third reference voltage is not greater than the fourth reference voltage, and maintaining the first switch in the reconfigurable inductor in an on state when the third reference voltage is greater than the fourth reference voltage; and if the switching voltage regulator is operating in the current sensing VR mode, detecting a load transient moment with a second comparator, the second comparator having a first input terminal, a second input terminal, and an output terminal, the first input terminal coupled to the third reference voltage, the second input terminal coupled to the fourth reference voltage, and the output terminal coupled to the first switch in the reconfigurable inductor, wherein the output terminal is configured to generate a first control bit to trigger the first switch to the on state in response to the load transient moment and is configured to generate a second control bit to trigger the first switch to the off state to re-assert a steady state.

A method to reduce overshoot in a switching voltage regulator using a reconfigurable inductor during a load transient moment, the method comprising, determining whether the switching voltage regulator is operating in a voltage sensing voltage regulator (VR) mode or a current sensing VR mode; if the switching voltage regulator is operating in the voltage sensing VR mode, determining whether a first reference voltage is greater than a second reference voltage, wherein the step of determining in the voltage sensing VR mode further comprises: maintaining a first switch in a reconfigurable inductor in an off state when the first reference voltage is not greater than the second reference voltage, and maintaining the first switch in the reconfigurable inductor in an on state when the first reference voltage is greater than the second reference voltage; if the switching voltage regulator is operating in the current sensing VR mode, determining whether a third reference voltage is greater than a fourth reference voltage, wherein the step of determining in the current sensing VR further comprises: maintaining the first switch in a reconfigurable inductor in an off state when the third reference voltage is not greater than the fourth reference voltage, and maintaining the first switch in the reconfigurable inductor in an on state when the third reference voltage is greater than the fourth reference voltage; and if the switching voltage regulator is operating in the voltage sensing VR mode, detecting the load transient moment with a first comparator, the comparator having a first input terminal, a second input terminal, and an output terminal, the first input terminal coupled to the first reference voltage, the second input terminal coupled to the second reference voltage, and the output terminal coupled to the first switch in the reconfigurable inductor, wherein the output terminal is configured to generate a first control bit to trigger the first switch to the on state in response to the load transient moment and is configured to generate a second control bit to trigger the first switch to the off state to re-assert a steady state, wherein the steady state of the reconfigurable inductor is proportional to the off state and is configured to provide a maximum inductance.

A method to reduce overshoot in a switching voltage regulator using a reconfigurable inductor during a load transient moment, the method comprising, determining whether the switching voltage regulator is operating in a voltage sensing voltage regulator (VR) mode or a current sensing VR mode; if the switching voltage regulator is operating in the voltage sensing VR mode, determining whether a first reference voltage is greater than a second reference voltage, wherein the step of determining in the voltage sensing VR mode further comprises: maintaining a first switch in a reconfigurable inductor in an off state when the first reference voltage is not greater than the second reference voltage, and maintaining the first switch in the reconfigurable inductor in an on state when the first reference voltage is greater than the second reference voltage; if the switching voltage regulator is operating in the current sensing VR mode, determining whether a third reference voltage is greater than a fourth reference voltage, wherein the step of determining in the current sensing VR further comprises: maintaining the first switch in a reconfigurable inductor in an off state when the third reference voltage is not greater than the fourth reference voltage, and maintaining the first switch in the reconfigurable inductor in an on state when the third reference voltage is greater than the fourth reference voltage; and wherein the on state of the reconfigurable inductor is configured to provide a reduced inductance value in response to the load transient moment.

A method to reduce overshoot in a switching voltage regulator using a reconfigurable inductor during a load transient moment, the method comprising, determining whether the switching voltage regulator is operating in a voltage sensing voltage regulator (VR) mode or a current sensing VR mode; if the switching voltage regulator is operating in the voltage sensing VR mode, determining whether a first reference voltage is greater than a second reference voltage, wherein the step of determining in the voltage sensing VR mode further comprises: maintaining a first switch in a reconfigurable inductor in an off state when the first reference voltage is not greater than the second reference voltage, and maintaining the first switch in the reconfigurable inductor in an on state when the first reference voltage is greater than the second reference voltage; and if the switching voltage regulator is operating in the current sensing VR mode: determining a sensed voltage at a load point, wherein the sensed voltage is coupled to the fourth reference voltage, and determining whether a third reference voltage is greater than a fourth reference voltage, wherein the step of determining in the current sensing VR further comprises: maintaining the first switch in a reconfigurable inductor in an off state when the third reference voltage is not greater than the fourth reference voltage, and maintaining the first switch in the reconfigurable inductor in an on state when the third reference voltage is greater than the fourth reference voltage.

In the foregoing specification, methods and apparatuses have been described with reference to specific exemplary embodiments thereof. It will be evident that various modifications may be made thereto without departing from the broader spirit and scope of embodiments as set forth in the following claims. The specification and drawings are, accordingly, to be regarded in an illustrative sense rather than a restrictive sense.

What is claimed is:

1. A voltage regulator, comprising:
a reconfigurable inductor;
the reconfigurable inductor having a conductive control ring, the conductive control ring having an adjustable enclosed area controlled by at least a first switch, wherein the adjustable enclosed area is configured to generate opposing field lines to intersect with magnetic field lines generated by the reconfigurable inductor, wherein the reconfigurable inductor has a varying inductance based on a state of at least the first switch and the adjustable enclosed area of the conductive control ring; and
a controller electrically coupled to the conductive control ring to adjust a total opposing magnetic flux based on the adjustable enclosed area, wherein the varying inductance of the reconfigurable inductor is adjusted based on the opposing field lines.

2. The voltage regulator of claim 1, wherein the reconfigurable inductor is coupled between a power supply and a load, and receives electrical power from the power supply and provides electrical power to the load.

3. The voltage regulator of claim 2, wherein the state of the first switch comprises an on state when the first switch is closed and an off state when the first switch is open.

4. The voltage regulator of claim 3, wherein the controller is configured to control the state of the first switch to vary the inductance of the reconfigurable inductor based on a size of the adjustable enclosed area when at least the first switch is in the on state.

5. The voltage regulator of claim 3, wherein the conductive control ring comprises a plurality of switches, and wherein the reconfigurable inductor has a maximum inductance when each switch of the conductive control ring is in the off state, and is configured to create more than one inductance values based on the plurality of switches that are in the on state.

6. The voltage regulator of claim 2, wherein the reconfigurable inductor is configured to generate the magnetic field lines when current flows through the inductor, and wherein the adjustable enclosed area is configured to generate the opposing field lines to intersect with the magnetic field lines when a current flows through the conductive control ring and at least the first switch is in an on state.

7. The voltage regulator of claim 6, wherein the controller is configured to increase the adjustable enclosed area to cause the opposing field lines to increase the total opposing magnetic flux, and wherein the varying inductance of the reconfigurable inductor is decreased when the opposing field lines are increased.

8. The voltage regulator of claim 1, wherein the adjustable enclosed area of the conductive control ring is controlled based on a plurality of switches that are in an on state.

9. The voltage regulator of claim 1, wherein the varying inductance of the reconfigurable inductor is configured to vary the inductance of the reconfigurable inductor over a range of inductance values, and wherein the reconfigurable inductor further comprises a plurality of conductive control rings.

10. A method to reduce undershoot in a switching voltage regulator, the method comprising:
determining whether the switching voltage regulator is operating in a voltage sensing voltage regulator (VR) mode or a current sensing VR mode, wherein the switching voltage regulator has a controller and a reconfigurable inductor configured during a load transient moment, the reconfigurable inductor has a conductive control ring, the conductive control ring has an adjustable enclosed area controlled by at least a first switch, the adjustable enclosed area is configured to generate opposing field lines to intersect with magnetic field lines generated by the reconfigurable inductor, wherein the reconfigurable inductor further has a varying inductance based on a state of at least the first switch and the adjustable enclosed area of the conductive control ring, wherein the controller is electrically coupled to the conductive control ring to adjust a total opposing magnetic flux based on the adjustable enclosed area, and wherein the varying inductance of the reconfigurable inductor is adjusted based on the opposing field lines;
determining whether a first reference voltage is greater than a second reference voltage when the switching voltage regulator is operating in the voltage sensing VR mode, wherein determining whether the switching voltage regulator is operating in the voltage sensing VR mode further comprises:
maintaining the first switch in the reconfigurable inductor in an off state when the first reference voltage is not greater than the second reference voltage, and
maintaining the first switch in the reconfigurable inductor in an on state when the first reference voltage is greater than the second reference voltage; and
determining whether a third reference voltage is greater than a fourth reference voltage when the switching voltage regulator is operating in the current sensing VR mode, wherein determining whether the switching voltage regulator is operating in the current sensing VR further comprises:
maintaining the first switch in the reconfigurable inductor in the off state when the third reference voltage is not greater than the fourth reference voltage, and
maintaining the first switch in the reconfigurable inductor in the on state when the third reference voltage is greater than the fourth reference voltage.

11. The method of claim 10, wherein the second reference voltage comprises an output voltage and an under voltage protection threshold.

12. The method of claim 10, wherein the third reference voltage comprises a voltage identification output, a load line value, and an under voltage protection offset.

13. The method of claim 10, further comprising:
detecting the load transient moment with a first comparator when the switching voltage regulator is operating in the voltage sensing VR mode, the comparator having a first input terminal, a second input terminal, and an output terminal, the first input terminal coupled to the first reference voltage, the second input terminal coupled to the second reference voltage, and the output terminal coupled to the first switch in the reconfigurable inductor, wherein the output terminal is configured to generate a first control bit to trigger the first switch to the on state in response to the load transient moment and is configured to generate a second control bit to trigger the first switch to the off state to re-assert a steady state.

14. The method of claim 13, wherein the steady state of the reconfigurable inductor is proportional to the off state and is configured to provide a maximum inductance.

15. The method of claim 10, further comprising:
detecting the load transient moment with a second comparator when the switching voltage regulator is operating in the current sensing VR mode, the second comparator having a first input terminal, a second input terminal, and an output terminal, the first input terminal coupled to the third reference voltage, the second input terminal coupled to the fourth reference voltage, and the output terminal coupled to the first switch in the reconfigurable inductor, wherein the output terminal is configured to generate a first control bit to trigger the first switch to the on state in response to the load transient moment and is configured to generate a second control bit to trigger the first switch to the off state to re-assert a steady state.

16. The method of claim 10, wherein the on state of the reconfigurable inductor is configured to provide a reduced inductance value in response to the load transient moment.

17. The method of claim 10, wherein prior to determining whether the third reference voltage is greater than the fourth reference voltage in the current sensing VR mode further comprises:
determining a sensed voltage at a load point, wherein the sensed voltage is coupled to the fourth reference voltage; and
determining a sensed inductor current in a power stage.

18. A method to reduce overshoot in a switching voltage regulator, the method comprising:
determining whether the switching voltage regulator is operating in a voltage sensing voltage regulator (VR) mode or a current sensing VR mode, wherein the switching voltage regulator has a controller and a reconfigurable inductor configured during a load transient moment, the reconfigurable inductor has a conductive control ring, the conductive control ring has an adjustable enclosed area controlled by at least a first switch, the adjustable enclosed area is configured to generate opposing field lines to intersect with magnetic field lines generated by the reconfigurable inductor, wherein the reconfigurable inductor further has a varying inductance based on a state of at least the first switch and the adjustable enclosed area of the conductive control ring, wherein the controller electrically coupled to the conductive control ring to adjust a total opposing magnetic flux based on the adjustable enclosed area, and wherein the varying inductance of the reconfigurable inductor is adjusted based on the opposing field lines;
determining whether a first reference voltage is greater than a second reference voltage when the switching voltage regulator is operating in the voltage sensing VR mode, wherein determining whether the switching voltage regulator is operating in the voltage sensing VR mode further comprises:
maintaining a first switch in the reconfigurable inductor in an off state when the first reference voltage is not greater than the second reference voltage, and
maintaining the first switch in the reconfigurable inductor in an on state when the first reference voltage is greater than the second reference voltage; and
determining whether a third reference voltage is greater than a fourth reference voltage when the switching voltage regulator is operating in the current sensing VR mode, wherein determining whether the switching voltage regulator is operating in the current sensing VR further comprises:
maintaining the first switch in the reconfigurable inductor in the off state when the third reference voltage is not greater than the fourth reference voltage, and
maintaining the first switch in the reconfigurable inductor in the on state when the third reference voltage is greater than the fourth reference voltage.

19. The method of claim 18, wherein the second reference voltage comprises a reference voltage and an over voltage protection threshold.

20. The method of claim 18, wherein the fourth reference voltage comprises a voltage identification output and an over voltage protection threshold.

21. The method of claim 18, further comprising:
detecting the load transient moment with a first comparator when the switching voltage regulator is operating in the voltage sensing VR mode, the comparator having a first input terminal, a second input terminal, and an output terminal, the first input terminal coupled to the first reference voltage, the second input terminal coupled to the second reference voltage, and the output terminal coupled to the first switch in the reconfigurable inductor, wherein the output terminal is configured to generate a first control bit to trigger the first switch to the on state in response to the load transient moment and is configured to generate a second control bit to trigger the first switch to the off state to re-assert a steady state.

22. The method of claim 21, wherein the steady state of the reconfigurable inductor is proportional to the off state and is configured to provide a maximum inductance.

23. The method of claim 18, further comprising:
detecting the load transient moment with a second comparator when the switching voltage regulator is operating in the current sensing VR mode, the second comparator having a first input terminal, a second input terminal, and an output terminal, the first input terminal coupled to the third reference voltage, the second input terminal coupled to the fourth reference voltage, and the output terminal coupled to the first switch in the reconfigurable inductor, wherein the output terminal is configured to generate a first control bit to trigger the first switch to the on state in response to the load transient moment and is configured to generate a second control bit to trigger the first switch to the off state to re-assert a steady state.

24. The method of claim 18, wherein the on state of the reconfigurable inductor is configured to provide a reduced inductance value in response to the load transient moment.

25. The method of claim 18, wherein prior to determining whether the third reference voltage is greater than the fourth reference voltage in the current sensing VR mode further comprises:
  determining a sensed voltage at a load point, wherein the sensed voltage is coupled to the fourth reference voltage.

* * * * *